United States Patent
Clements et al.

(10) Patent No.: US 10,859,241 B2
(45) Date of Patent: Dec. 8, 2020

(54) MODULAR LUMINAIRE

(71) Applicant: SIGNIFY HOLDING B.V., Eindhoven (NL)

(72) Inventors: Steven Russell Clements, Atlanta, GA (US); Russell Tyler Martin, Peachtree City, GA (US); Anthony James Carney, Fayetteville, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/694,729

(22) Filed: Nov. 25, 2019

(65) Prior Publication Data

US 2020/0096177 A1 Mar. 26, 2020

Related U.S. Application Data

(63) Continuation of application No. 15/915,859, filed on Mar. 8, 2018, now Pat. No. 10,488,022.

(60) Provisional application No. 62/468,794, filed on Mar. 8, 2017, provisional application No. 62/468,804, filed on Mar. 8, 2017.

(51) Int. Cl.
| | |
|---|---|
| *F21V 17/00* | (2006.01) |
| *F21S 8/02* | (2006.01) |
| *F21V 5/00* | (2018.01) |
| *F21V 23/04* | (2006.01) |
| *H05B 45/10* | (2020.01) |
| *F21V 23/00* | (2015.01) |
| *F21Y 103/10* | (2016.01) |
| *F21Y 115/10* | (2016.01) |
| *F21V 19/04* | (2006.01) |
| *F21Y 115/15* | (2016.01) |

(52) U.S. Cl.
CPC ............ *F21V 17/002* (2013.01); *F21S 8/026* (2013.01); *F21V 5/00* (2013.01); *F21V 23/0442* (2013.01); *H05B 45/10* (2020.01); *F21V 19/04* (2013.01); *F21V 23/001* (2013.01); *F21V 23/0464* (2013.01); *F21Y 2103/10* (2016.08); *F21Y 2115/10* (2016.08); *F21Y 2115/15* (2016.08)

(58) Field of Classification Search
CPC .......... F21V 21/047; F21V 7/04; F21V 29/70; F21V 21/14; F21S 8/026; F21Y 2115/10
See application file for complete search history.

(56) References Cited

U.S. PATENT DOCUMENTS

| | | | | |
|---|---|---|---|---|
| 2010/0020550 | A1‡ | 1/2010 | Kawashima | ........ F21V 23/0435 362/362 |
| 2010/0294915 | A1‡ | 11/2010 | Williams | .................. G01J 1/04 250/206.1 |
| 2011/0133655 | A1‡ | 6/2011 | Recker | ...................... H02J 9/02 315/159 |
| 2013/0207552 | A1‡ | 8/2013 | Plunk | ........................ F21S 8/02 315/152 |

(Continued)

*Primary Examiner* — Kevin Quarterman

(57) ABSTRACT

A modular troffer luminaire includes a housing having a perimeter frame, and a first light module removably attached to the housing. The first light module is replaceable by a second light module after the modular troffer luminaire is installed, where the first light module comprises an LED light source and an optic. The modular troffer luminaire further includes a sensor attached to the perimeter frame. The first light module is controllable based on sensing information from the sensor.

20 Claims, 17 Drawing Sheets

(56) References Cited

U.S. PATENT DOCUMENTS

| | | | |
|---|---|---|---|
| 2015/0185751 A1‡ | 7/2015 | Karc | G05F 1/66 700/295 |
| 2017/0231058 A1‡ | 8/2017 | Sadwick | H05B 33/0857 |
| 2019/0014642 A1‡ | 1/2019 | Chen | H05B 37/0227 |

‡ imported from a related application

MODULAR LUMINAIRE

CROSS REFERENCE TO RELATED APPLICATIONS

The present application is a continuation application of and claims priority to U.S. Nonprovisional patent application Ser. No. 15/915,859, filed Mar. 8, 2018 and titled "Modular Luminaire," which claims priority under 35 U.S.C. Section 119(e) to U.S. Provisional Patent Application No. 62/468,794, filed Mar. 8, 2017 and titled "Modular Smart Troffer" and U.S. Provisional Patent Application No. 62/468,804, filed Mar. 8, 2017 and titled "Modular High Bay Luminaire." The entire contents of all of the preceding applications are incorporated herein by reference.

TECHNICAL FIELD

The present disclosure relates generally to lighting solutions, and more particularly to troffer luminaires and high bay luminaires that can be modified to provide different lighting and lighting control features.

BACKGROUND

Many structures (e.g., commercial buildings) use troffer luminaires and/or high bay luminaires to provide lighting. Some troffer luminaires may include particular types of light modules and other features. Some high bay luminaires may include light modules that include a light source with a particular lumen, color, etc. as well as other components such as sensors. In some cases, a potential or new occupant (e.g., a potential or new tenant) of a space, such as a floor in a commercial building, an entire building, a manufacturing facility, a storage facility, etc., may desire different lighting than provided by the installed troffer luminaires and/or high bay luminaires. A potential or new occupant may also want different and/or additional features, such as light control features. For example, the new occupant may prefer to have particular types of sensors (e.g., a motion sensor, camera, humidity, etc.) instead of or in addition to the sensors included with the installed high bay luminaires. However, replacing entire installed luminaires can be expensive and time consuming, and can produce a large amount of waste. Thus, modular troffer luminaires and modular high bay luminaires that simplify changing the lighting provided by the luminaires and/or features of the luminaires, such as lighting control options, may be desirable.

SUMMARY

The present disclosure relates generally to lighting solutions, and more particularly to troffer luminaires and high bay luminaires that can be modified to provide different lighting and lighting control features. In an example embodiment, a modular troffer luminaire includes a housing having a perimeter frame, and a first light module removably attached to the housing. The first light module is replaceable by a second light module after the modular troffer luminaire is installed, where the first light module comprises an LED light source and an optic. The modular troffer luminaire further includes a sensor attached to the perimeter frame. The first light module is controllable based on sensing information from the sensor.

In another example embodiment, a modular troffer luminaire includes a housing having a perimeter frame, and a first light module removably attached to the housing. The first light module is replaceable by a second light module after the modular troffer luminaire is installed, where the first light module includes an LED light source and a light emitting panel. The modular troffer luminaire further includes a sensor attached to the perimeter frame, where the first light module is controllable based on sensing information from the sensor.

In another example embodiment, a modular high bay luminaire includes a housing, an enclosure attached to the housing, and a light module attached to the housing. The light module includes a first light emitting diode (LED) light source and an optic, where the first LED light source is replaceable by a second LED light source. The modular high bay luminaire further includes a first sensor disposed in a cavity of the enclosure, where the first sensor extends through a hole in the enclosure. The first sensor is replaceable by a second sensor after the modular high bay luminaire is installed.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
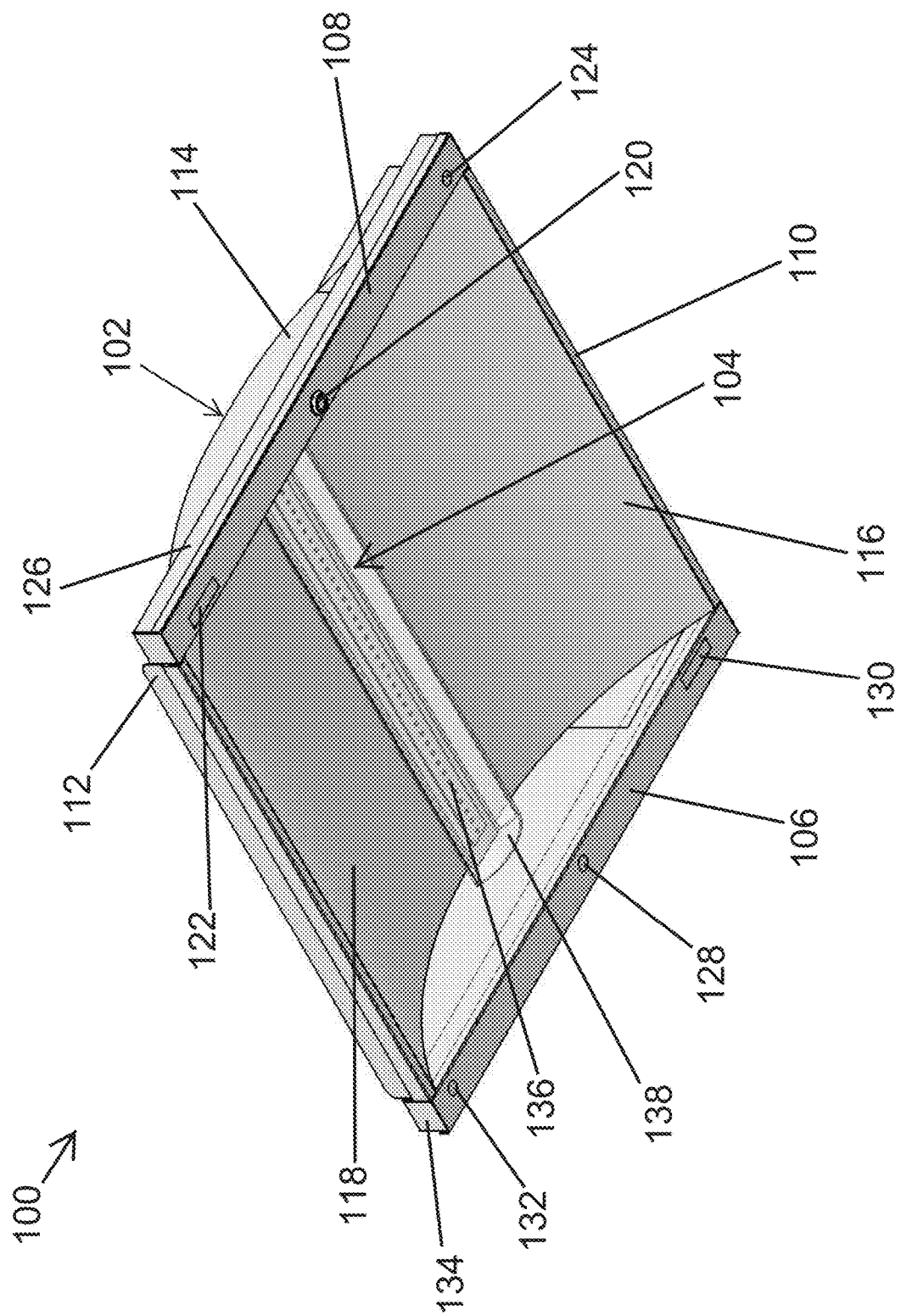
FIG. 1 is a bottom perspective view of a modular troffer luminaire according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings designate like or corresponding, but not necessarily identical, elements.

DETAILED DESCRIPTION OF EXAMPLE EMBODIMENTS

The present disclosure relates to modular troffer luminaires and modular high bay luminaires that can be modified to provide different lighting and lighting control features. The modular troffer luminaire described herein can be modified to provide different lighting and lighting control features by replacing the light module of the luminaire and by adding or replacing other features of the luminaire. The modular high bay luminaire described herein can be modified to provide different lighting and lighting control features by replacing the light source and the optic of the luminaire and/or by replacing and/or adding other features of the luminaire. The modular troffer luminaire and modular high bay luminaire each enable a building owner to select a cost effective lighting solution that meets all required codes and permits and also allow a subsequent tenant or owner to make lighting changes without replacing the entire luminaire.

To illustrate, the modular troffer luminaire may initially have a basic light module that can be replaced with a different (e.g., a higher lumen) light module to meet a specific need or preference of a tenant or an owner. Connectivity and lighting control devices may also be replaced or added to the luminaire based on a tenant's or owner's preference or need. A subsequent tenant or owner can later change the light module and/or the connectivity and lighting control devices, thus avoiding a need to replace the entire luminaire. For example, the modular troffer luminaire may initially be a center basket fixture for permit lighting. A first tenant that occupies the building may add a light module with waveguides and a higher lumen output light source. A subsequent tenant of the building may return to the center basket option and add occupancy and daylight sensors to control the luminaire. Connectivity modules that can support ZigBee, Bluetooth, visible light communication (VLC), etc. may also be replaced or added to the installed modular troffer luminaire.

At initial installation, a modular high bay luminaire may have an LED light source that emits a relatively low lumen light (e.g., 16000 lumen) that can be replaced with a replacement LED light source that emits a higher lumen light (e.g., 24000 lumen). The replacement LED light source may also emit a light that has a different color temperature, a different color, etc. Further, the replacement LED light source may itself be replaceable by another light source at a later time, for example, by a subsequent occupant.

In addition to the light source, the optic of the modular high bay luminaire may be replaced by a replacement optic that provides a different optical effect and/or aesthetics. For example, a replacement optic may be a simple lens such as a clear, frosted or ribbed lens or another type of lens that reduces glare. The replacement optic may also provide modular distributions of light or may be a modular waveguide panel. Further, existing connectivity and lighting control devices of the modular high bay luminaire may be replaced or new ones may be added to the high bay modular luminaire. For example, asset tracking devices, cameras, etc. may be replaced or added to the installed modular high bay luminaire, thus avoiding a need to replace the entire luminaire. Connectivity modules that can support ZigBee, Bluetooth, visible light communication (VLC), etc. may also be replaced or added to the installed modular high bay luminaire.

Figure 2:
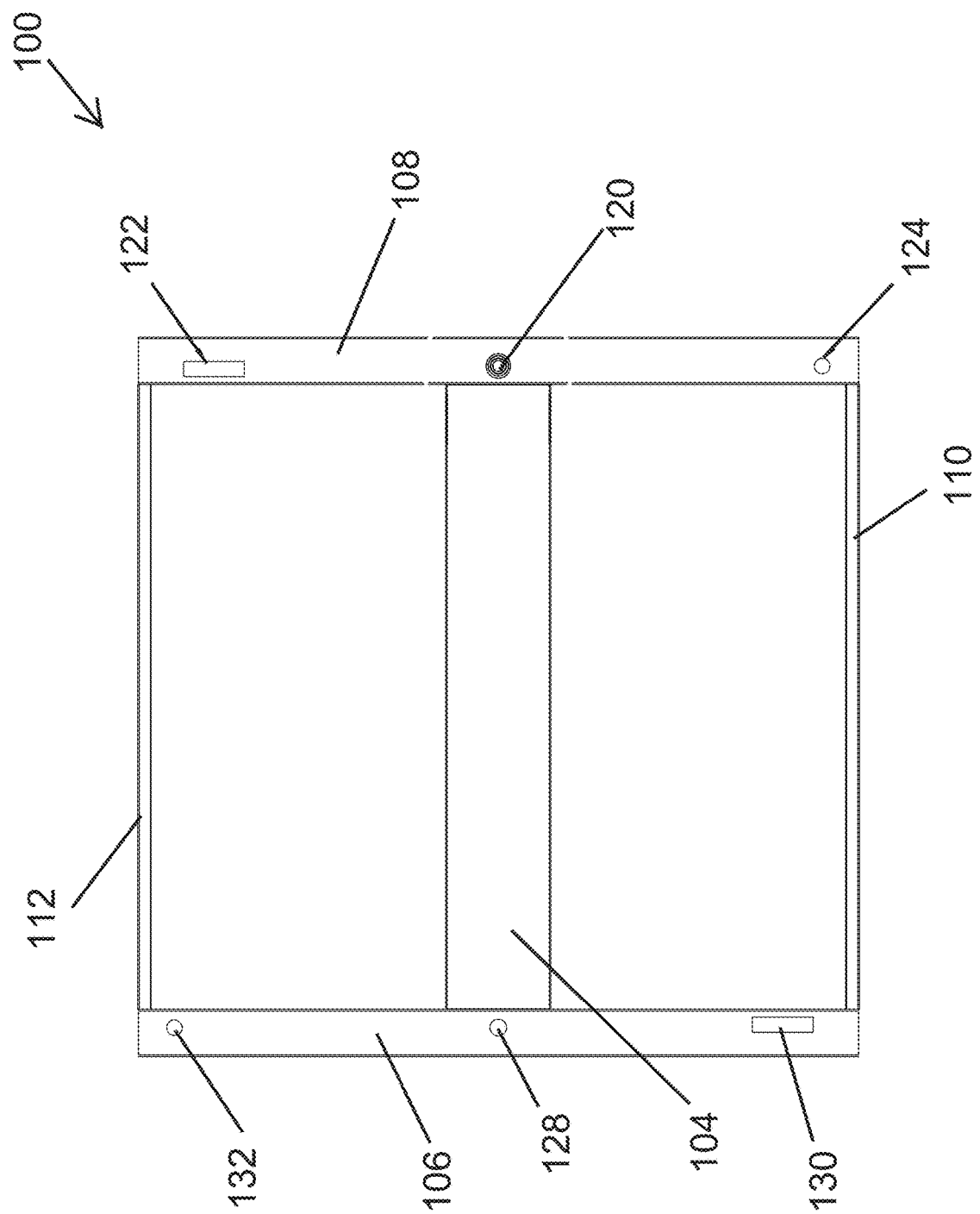
FIG. 2 is a bottom view of the modular troffer luminaire of FIG. 1 according to an example embodiment.

Turning to the drawings, FIG. 1 is a bottom perspective view of a modular troffer luminaire 100 according to an example embodiment, and FIG. 2 is a bottom view of the modular troffer luminaire 100 of FIG. 1 according to an example embodiment. Referring to FIGS. 1 and 2, in some example embodiments, the luminaire 100 includes a housing 102 and a light module 104. For example, the light module 104 may be positioned in a cavity of the housing 102. The housing 102 may include perimeter frames that include end frames 106, 108 and side frames 110, 112, and a cover 114 that provides an enclosure on the back side of the housing 102. For example, when the luminaire 100 is installed in a ceiling, the back cover 114 may be recessed behind the ceiling and the end frames 106, 108 and the side frames 110, 112 may be at least partially viewable and accessible from below the luminaire 100.

In some example embodiments, the back cover 114 may include a first curved section 116 and a second curved section 118. The light module 104 may be at least partially positioned in a gap or an opening between the first curved section 116 and the second curved section 118. Alternatively, the light module 104 may be removably attached to the back cover 114 in a different manner, such as using fasteners that extend through the back cover 114. In some alternative embodiments, one or both of the first curved section 116 and the second curved section 118 may be replaced by a structure that is not curved or a structure that otherwise has a different shape than shown in FIG. 1. The light module 104 may be attached to the back cover 114 with features such as tabs and slots to allow for slide and lock into position attachment or reverse for detachment. Alternatively, molded features can be used to allow action with snap and lock into position and with a squeeze or tool insertion for release functionality.

In some example embodiments, the light module 104 may include a light source 136 and an optic 138. For example, the light source 136 may include one or more discrete light emitting diodes (LEDs), one or more organic LEDs (OLEDs), an LED chip on board that includes one or more discrete LEDs, and/or an array of discrete LEDs. In some alternative embodiments, the light module 104 may include another type of light source without departing from the scope of this disclosure. In some example embodiments, the light source 136 may have a relatively low lumen output, for example, to reduce the overall cost of the luminaire 100 for initial installation. The optic 138 of the light module 104 may also be a basic optic to reduce the overall cost of the luminaire 100.

In some example embodiments, the light module 104 is replaceable by another light module that may, for example, provide a higher lumen output and/or a different light distribution. For example, a tenant that leases an area of a building or an entire building may have different lighting preferences than provided by the light module 104. The tenant may achieve the desired lighting by replacing just the light module 104 of the luminaire 100. To illustrate, the light module 104 is replaceable by another light module, such as the light modules shown in FIGS. 5 and 8. The light module 104 can be removably attached to the housing 102 such that the light module 104 can be readily replaced by a replacement light module that gets attached to the housing 102.

In some example embodiments, the luminaire 100 may include a sensor 120 that is attached to the end frame 108. The sensor 120 may be a daylight sensor, a motion sensor, or a combination thereof. As explained below, the sensor 120 may be powered by a power source (e.g., a driver such as an LED driver) that is inside an electronics compartment at the back side of the housing 102. The sensor 120 may also communicate sensing information (e.g., daylight indication) to the power source or to a lighting control device that is inside the electronics compartment. Alternatively, the sensor 120 may wirelessly transmit the sensing information to a remote lighting control device or another device. The light module 104 may be controlled based on the sensing information from the sensor 120.

In some example embodiments, the sensor 120 may be included because of code or permit requirements. In some alternative embodiments, the sensor 120 may be omitted when a sensor is not required by code. For example, the location on the end frame 108 where the sensor 120 is attached as shown in FIG. 1 may be covered by a knockout section that can be removed to attach the sensor 120 or another device to the end frame 108 at a later time.

In some example embodiments, the sensor 120 may be replaced by a different sensor, for example, to meet the preference of a subsequent occupant. For example, a new occupant may desire a better sensor or a different type of sensor than the sensor 120. After removing the sensor 120, another sensor may be attached to the end frame 108 at the same location as the sensor 120. The wiring used to connect the sensor 120 to a power source and/or to another control device may be used to connect the replacement sensor to the power source and/or another control device. Alternatively, a different wiring may be used to connect the replacement sensor to the power source and/or to another control device.

In some alternative embodiments, instead of or in addition to replacing the sensor 120, another sensor or device may be added to the luminaire 100 at a different location. The sensor 120 may be attached to the end frame 108 by a means that enables ease of removal as can be understood by those of ordinary skill in the art with the benefit of this disclosure. To illustrate, the sensor 120 can be held in the end frame 108 with a secondary threaded nut or a snap ring, or by molded features on the sensor 120 that snap into the hole left, for example, after a knock out is removed. Alternatively the sensor 120 may be mounted to a plate (e.g., molded plate) that snaps into a hole in end frame 108. The plate could come in a blank version to fill the hole in the end frame 108 if the sensor 120 is removed without a replacement sensor or device at the same location.

To illustrate, the end frame 108 may include knockout sections 122, 124, and the end frame 106 may include knockout sections 128, 130, 132. Each one of the knockout sections 128, 130, 132 may be removed, for example, by applying a force on the particular knockout section 128, 130, 132 and without the need to cut through the end frame 106, 108. For example, a rectangular hole is formed in the end frame 108 by removing the knockout section 122, and a round hole is formed in the end frame 108 by removing the knockout section 124. The light module 104 may be controlled based on the sensing information from other devices that are added to the luminaire 100.

In some example embodiments, the knockout section 122 may have a different shape from the knockout section 124 to provide flexibility to attach a sensor or another device (e.g., a camera) to the end frame 108 that may need a particularly shaped hole. Similarly, the knockout section 130 may have a different shape from the knockout sections 128, 132 to provide flexibility to attach a sensor or another device (e.g., a camera) to the end frame 106. As illustrated in FIG. 1, the knockout sections 122 and 130 each cover a rectangular hole, and the knockout sections 124, 128, 132 each cover a circular shaped hole that may vary in size.

An electrical connection, such as an electrical cable (e.g., a two strand wire, a telephone wire, etc.), may be routed to a sensor or to another device that may be attached to the end frames 106, 108, for example, after removing a knock out section such as the knockout section 122, 128. For example, the luminaire 100 may include channel structures 126, 134 that allow routing electrical cables therethrough. The channel structure 126 may be positioned on the end frame 108, and an electrical cable may be routed to a sensor or another device that is attached to the end frame 108 at the location of the knockout section 122 and/or the knockout section 124. The electrical cable may be used to provide power to the added sensor/device from a power source that is inside the electronics compartment. The electrical cable may also be used for communication between the added sensor/device and a control device that is inside the electronics compartment. The electrical cable may be routed between the electronics compartment and the channel structures 126, 134 after, or before, the new sensor/device is added to the luminaire 100.

In some example embodiments, the channel structures 126, 134 are covers that can be removed from the end frames 108, 106, respectively, to allow access from the plenum side of the fixture 100. For example, the channel structures 126, 134 can be removed by removing fastener(s), by depressing a snap release feature, etc. Removing the channel structures 126, 134 allows access to the connections on the back side of the sensors, camera, etc. and to cables between devices and controllers/power packs. Alternately, sensors or other devices can be mounted on a plate (e.g., molded plate) that snaps in from below the end frame 106, 108 allowing for a sensor swap (or a swap of another device) without going into plenum space. In this instance, control cables may be run in the fixture during assembly, for example, at the plant and allow for quick additions of sensors and other devices by removing a blank plate and attaching a replacement plate that includes a sensor or another device attached to or thereon.

In general, electrical power may be provided to the sensor 120 or to a replacement sensor/device using an electrical cable that is routed to the sensor 120 or to the replacement sensor/device through the channel structure 126. The same or a different electrical cable may be used for communication between a sensor/device that may be attached to the end frame 108 and a control device inside the electronics compartment. For example, sensing or other information may be communicated between the sensor 120 or a replacement sensor/device and a control device using the electrical cable or another cable. Electrical power may be provided to another sensor or device that may be attached to the end frame 106 in a similar manner by routing an electrical cable through the channel structure 134.

By providing a light module, a sensor, and other devices that can be replaced after the installation of the modular troffer luminaire 100, the modular troffer luminaire 100 enables cost effective as well as code-compliant initial installations. The ability to replace the initially installed light module allows a builder and/or owner to accommodate the preferences of a subsequent owner, tenant, etc. or based on an owner's preferences. By enabling the addition of new devices, such as sensors, etc., as well as the option to replace the installed light module, sensor, etc. with different and/or better ones, the modular troffer luminaire 100 enables a landlord or owner to accommodate the preferences of a subsequent owner, tenant, etc. or the owner's preferences. Costs and complexity that may result from replacing a luminaire that does not support replacement and addition of components can also be avoided by the use of the modular troffer luminaire 100. In some alternative embodiments, the luminaire 100 may have fewer or more knockout sections than shown without departing from the scope of this disclosure. In some example embodiments, the knockout sections may be at different locations than shown without departing from the scope of this disclosure. Further, in some alternative embodiments, the side frames 110, 112 may include knockout sections or sensors/devices attached thereto instead of or in addition to the end frames 106, 108 without departing from the scope of this disclosure. In some example embodiments, the sensor 120 may be at a different location than shown without departing from the scope of this disclosure. In some alternative embodiments, the housing 102 may have a different shape than shown without departing from the scope of this disclosure. For example, the housing 122 may have a different aspect ratio of the side frames and the end frames and/or different relative dimensions.

Figure 3:
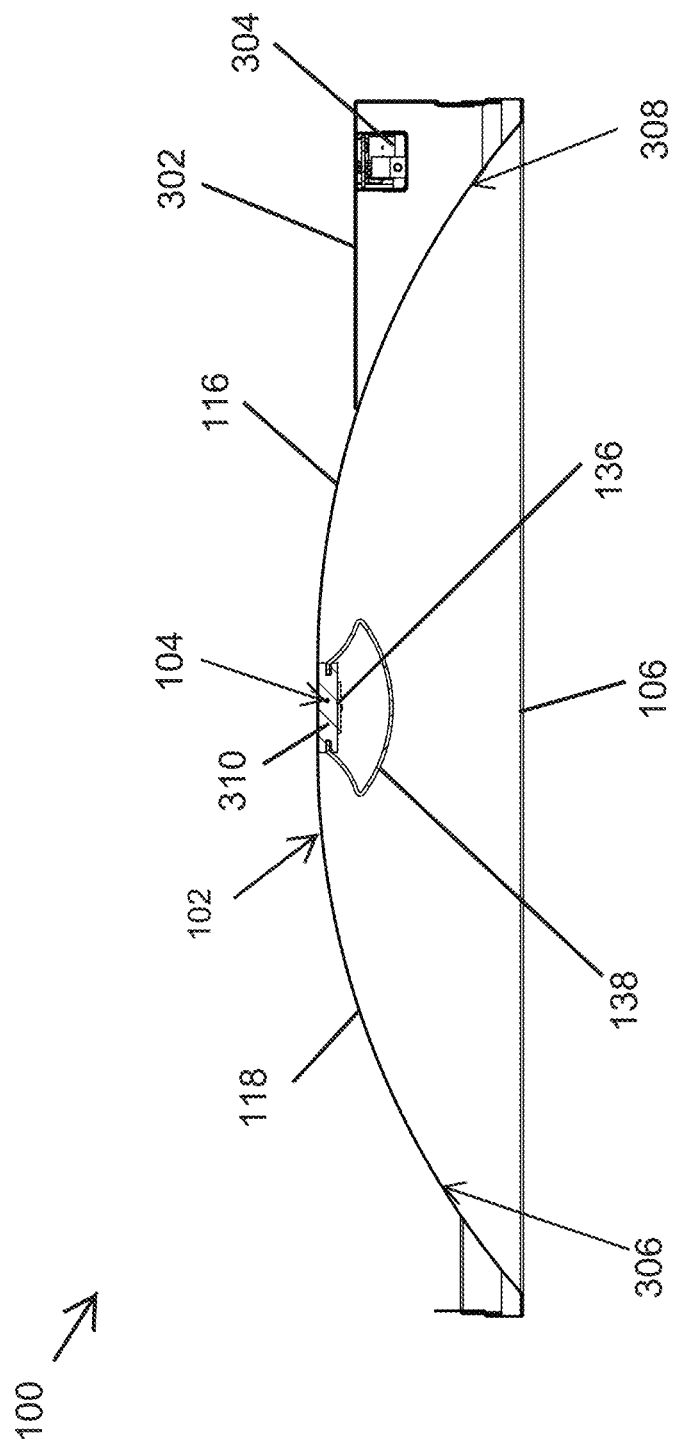
FIG. 3 is a cross-sectional view of the modular troffer luminaire of FIG. 1 according to an example embodiment.

FIG. 3 is a cross-sectional view of the troffer luminaire 100 of FIG. 1 according to an example embodiment. Referring to FIGS. 1-3, the luminaire 100 includes the light module 104 that is attached to the housing 102. The light module 104 is located in the cavity of the housing 102 and includes the light source 136 and the lens 138. The light source 136 may be attached to a center panel 310 of the light module 104. As illustrated in FIGS. 1-3, the housing 102 may be centrally located between the side frames 110, 112. For example, the light module 104 may be centrally located with respect to the curved sections 116, 118 of the back cover 114. Alternatively, the light module 104 may be located off-center. In some example embodiments, the curved section 116 may have a reflective surface 308, and the curved section 118 may have a reflective surface 306.

In some example embodiments, the housing 102 includes an electronics compartment 302 on the outside of the housing 102. For example, the electronics compartment 302 may be located on the back side of the housing 102 such that the electronics compartment 302 is hidden from view when the luminaire 100 is installed in a ceiling. The electronics compartment 302 provides a space for storing electrical devices and components such as a driver 304 (e.g., an LED driver).

In some example embodiments, the driver 304 may provide power to the light module 104 including the light source 136. For example, the driver 304 may receive AC power from an AC input power line and output DC power that is appropriate to power the light module 104. Alternatively, the driver 304 may include a DC/DC converter that receives DC power from a DC input power line (e.g., a distributed low voltage power (DLVP) backbone, power over Ethernet (PoE) or other cabled power connections) and output DC power that is appropriate to power the light module 104. The driver 304 or another power (e.g., a control pack) module may provide power to the sensor 120 and to one or more other devices (e.g., another sensor) that may be added to the luminaire 100 at a later time, for example, by a new occupant of a building. The driver 304 may also be capable of providing adequate power to a replacement light module that can provide higher lumen light than the light module 104 or that otherwise requires more power.

Figure 4A:
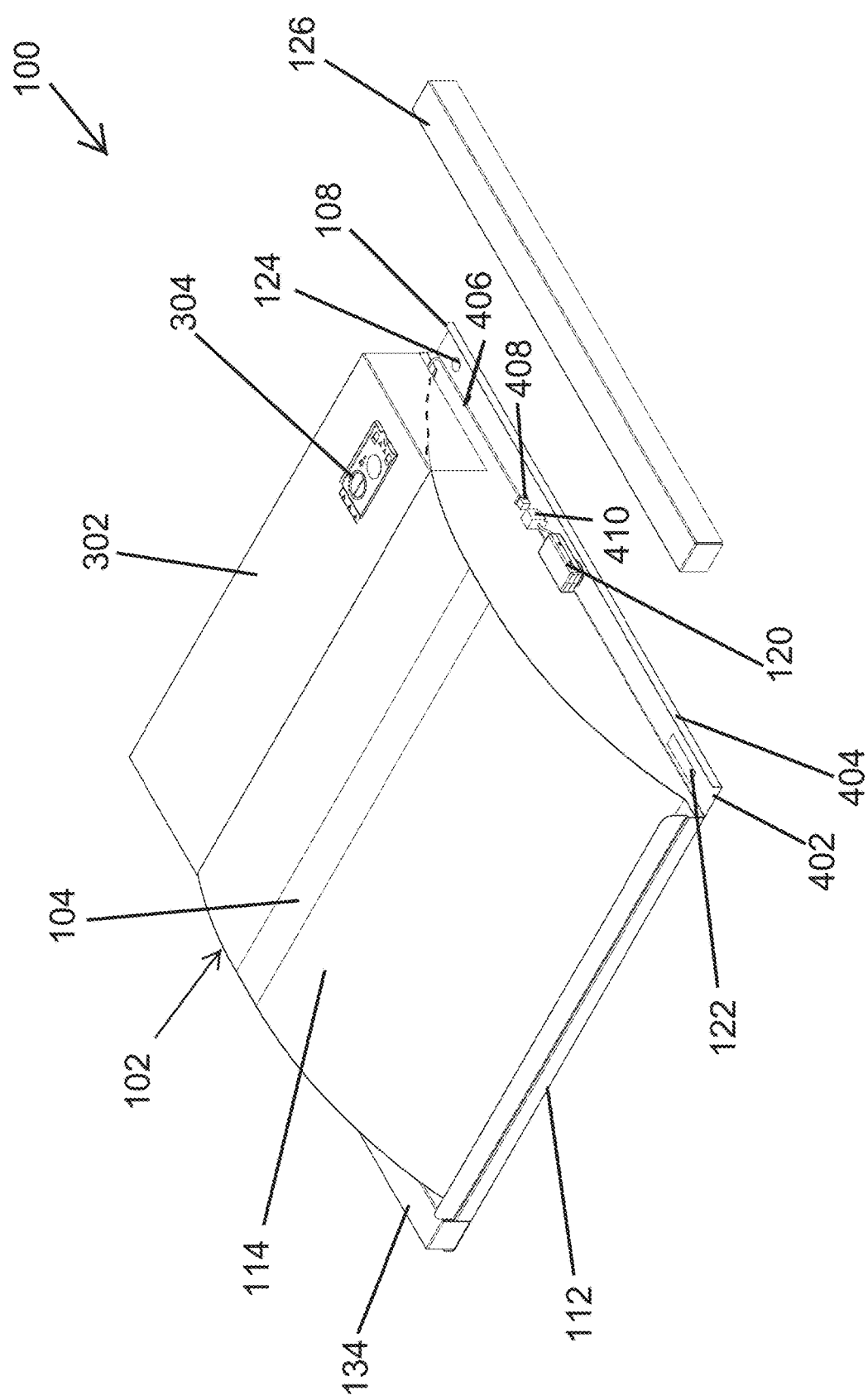
FIG. 4A is a partially exploded top perspective view of the modular troffer luminaire of FIG. 1 according to an example embodiment.
Figure 4B:
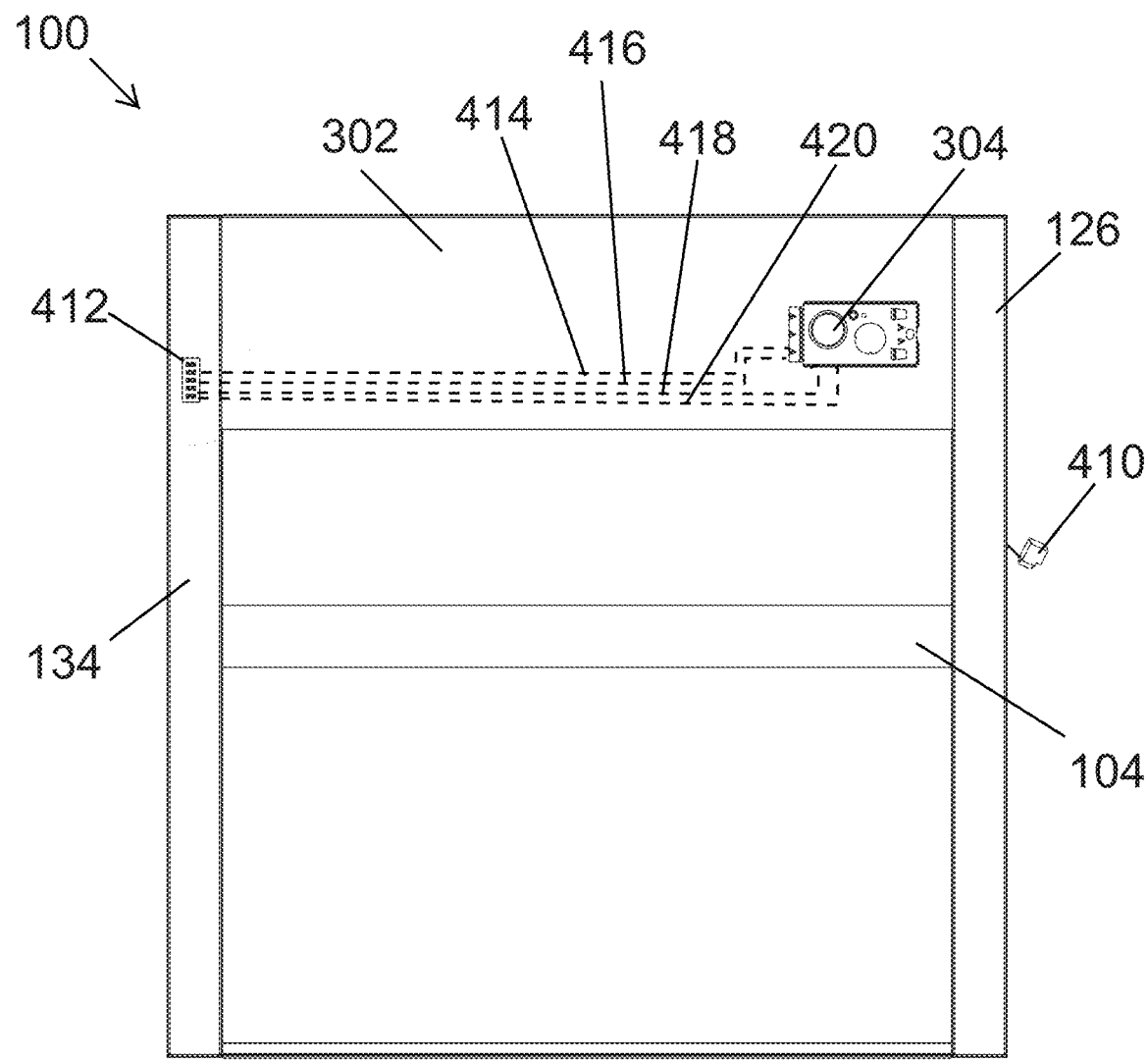
FIG. 4B is a top view of the modular troffer luminaire of FIG. 1 according to an example embodiment.

FIG. 4A is a partially exploded top perspective view of the modular troffer luminaire 100 of FIG. 1 according to an example embodiment. FIG. 4B is a top view of the modular troffer luminaire 100 of FIG. 1 according to an example embodiment. Referring to FIGS. 1-4B, the end frame 108 may include a base section 402 and an edge section 404. For example, the channel structure 126 may be positioned on the base section 402 bounded by the edge section 404 on the outside. In some example embodiments, the channel structure 126 may be at least partially hollow such that the sensor 120 that is positioned on the base section 402 of the end frame 108 is inside the cavity of the channel structure 126 when the channel structure 126 is positioned on the base section 402. The channel structure 126 may be positioned on the base section 402 without being fastened to the end frame 108 or to another part of the housing 102. Alternatively, one or more fasteners may be used to securely attach the channel structure 126 to the end frame 108 or another part of the housing 102.

In some example embodiments, the channel structure 126 may also provide adequate cavity space for a replacement sensor or another device that may be a replacement to the sensor 120 at the same location or at one of the knockout sections 122, 124. The channel structure 126 may also provide adequate cavity space for additional devices (e.g., a camera) that may be added to the luminaire 100 at the knockout sections 122, 124.

In some example embodiments, an electrical cable 406 may be routed under the channel structure 126, for example, between the driver 304 and the sensor 120. The electrical cable 406 may include a connector 408 (e.g., an RJ45 connector) that can be coupled to a mating connector 410 of the sensor 120. For example, the electrical cable 406 may be a CAT 5 cable, a CAT 6 cable, strands of electrical wires, a telephone wire, or another suitable wire that can be used to provide low voltage power to the sensor 120. The electrical cable 406 may also be used for communication between the sensor 120 and the driver 304 or another device (e.g., a control and/or communication module) that may be inside the electronics compartment 302. For example, the driver 304 or another control device may control the light module 104 based on sensing information from the sensor 120 that is provided via the cable 406. In some alternative embodiments, the sensor 120 and other devices may be powered by the driver 304 using an electrical cable, such as the electrical cable 406, but may communicate wirelessly with the driver 304 and/or another device to provide sensing and other information.

In some example embodiments, the wiring that includes the cable 406 and connector 408 may be used with a replacement sensor or another device that replaces the sensor 120. Similar wiring may be used with other devices that may be added to the luminaire 100 at the knockout sections 122, 124 of the end frame 108. Similar wiring may also be used at the end frame 106, where one or more electrical cables are routed from the driver 304 and/or another device in the electronics compartment 302 to one or more devices (e.g., a camera) under the channel structure 134.

In some example embodiments, the modular troffer luminaire 100 may include a receptacle 412 that includes multiple ports. For example, the receptacle 412 may include an AC power port, which includes a pair of connections (e.g., power and ground connections. The AC power port may be or can readily be connected to the input AC power line that is also connected to and provides AC power to the driver 304. For example, an electrical cable 414 (e.g., a pair of electrical wires) may be used to connect the AC power port of the receptacle 412 with the input AC power line. A device that is later added to the luminaire 100 and that requires input AC power can be powered by connecting the device to the AC power port of the receptacle 412 using an electrical cable (e.g., electrical wires for power and ground connections). For example, the electrical cable may be terminated at a connector that can be plugged into the entire receptacle 412 or just the AC power port. The later added device may be a control pack or another device that receives input AC power and outputs DC power that can be used to power a sensor (e.g., a motion sensor, etc.).

In some example embodiments, the receptacle 412 may also include a DC power port, which can include a pair of connections (e.g., power and ground connections). The DC power port may already be or can readily be connected to the input DC power line that is also connected to and provides DC power to the driver 304 (e.g., which may include a DC/DC converter) or another DC/DC converter. For example, an electrical cable 416 (e.g., a pair of electrical wires) may be used to connect the DC power port of the receptacle 412 with the input DC power line. A device that is later added to the luminaire 100 and that requires input DC power can be powered by connecting the device to the DC power port of the receptacle 412 using an electrical cable (e.g., electrical wires for power and ground connections). For example, the electrical cable may be terminated at a connector that can be plugged into the DC power port or the entire receptacle 412.

In some example embodiments, the receptacle 412 may also include a dim control port, which may include one or more connections. The dim control port of the receptacle 412 may already be or can readily be connected to the dim control input(s) (e.g., 0-10V, DALI, etc.) of the driver 304 by an electrical cable 418. For example, a device (e.g., control pack) that has a dimming control capability may later be added to the luminaire 100 by connecting the device to the dim control port of the receptacle 412 using an electrical cable. The electrical cable may be terminated at a connector that can be plugged into the dim control port or the entire receptacle 412. Because the dim control port of the receptacle 412 is already or can readily be connected to the dim control input of the driver 304, the newly added device can control the dimming operation of the driver 304, for example, based on a dimming control input from a sensor or a remote control device.

In some example embodiments, the receptacle 412 may also include a general purpose port, which may include one or more connections. For example, the general purpose port may be used to support the addition of a communication module to luminaire 100, for example, based on the preference of a new owner or tenant. For example, the receptacle 412 may already be or can readily be connected to the dim control input(s) (e.g., 0-10V, DALI, etc.) or another input of the driver 304 by an electrical cable 420. A wireless communication device may later be added to the luminaire 100 by connecting the wireless communication device to the general purpose port of the receptacle 412 using an electrical cable. The electrical cable may be terminated at a connector that can be plugged into the general purpose port or the entire receptacle 412. Because the general purpose control port of the receptacle 412 is already or can readily be connected to the driver 304, the newly added wireless communication device can be used to remotely control relevant operations of the driver 304.

In some example embodiments, the receptacle 412 is a Class 1 receptacle where a device can be safely plugged into the receptacle 412 while power (e.g., from 120 VAC power supply) is provided to the AC power port of the receptacle 412. For example, the receptacle 412 may be a Class 1 UL certified receptacle.

The receptacle 412 of the modular troffer luminaire 100 allows initial cost reduction by providing the ability to add a device such as an auxiliary power supply/power pack, sensors, etc. at a later time instead of during the initial installation of the luminaire 100. The receptacle 412 also enables adding a new device to the existing luminaire 100, which eliminates the need to replace the luminaire 100.

In some alternative embodiments, the receptacle 412 may be at a different location than shown without departing from the scope of this disclosure. In some alternative embodiments, the receptacle 412 may have a different shape than shown without departing from the scope of this disclosure. In some alternative embodiments, the receptacle 412 may include more or fewer ports than shown without departing from the scope of this disclosure. For example, the receptacle 412 may include only the AC power port, the DC power port, the dim control port, or the auxiliary port. The receptacle 412 may also include more than one port of the same type without departing from the scope of this disclosure. The ports of the receptacle 412 may also be in a different order than show.

Figure 5:
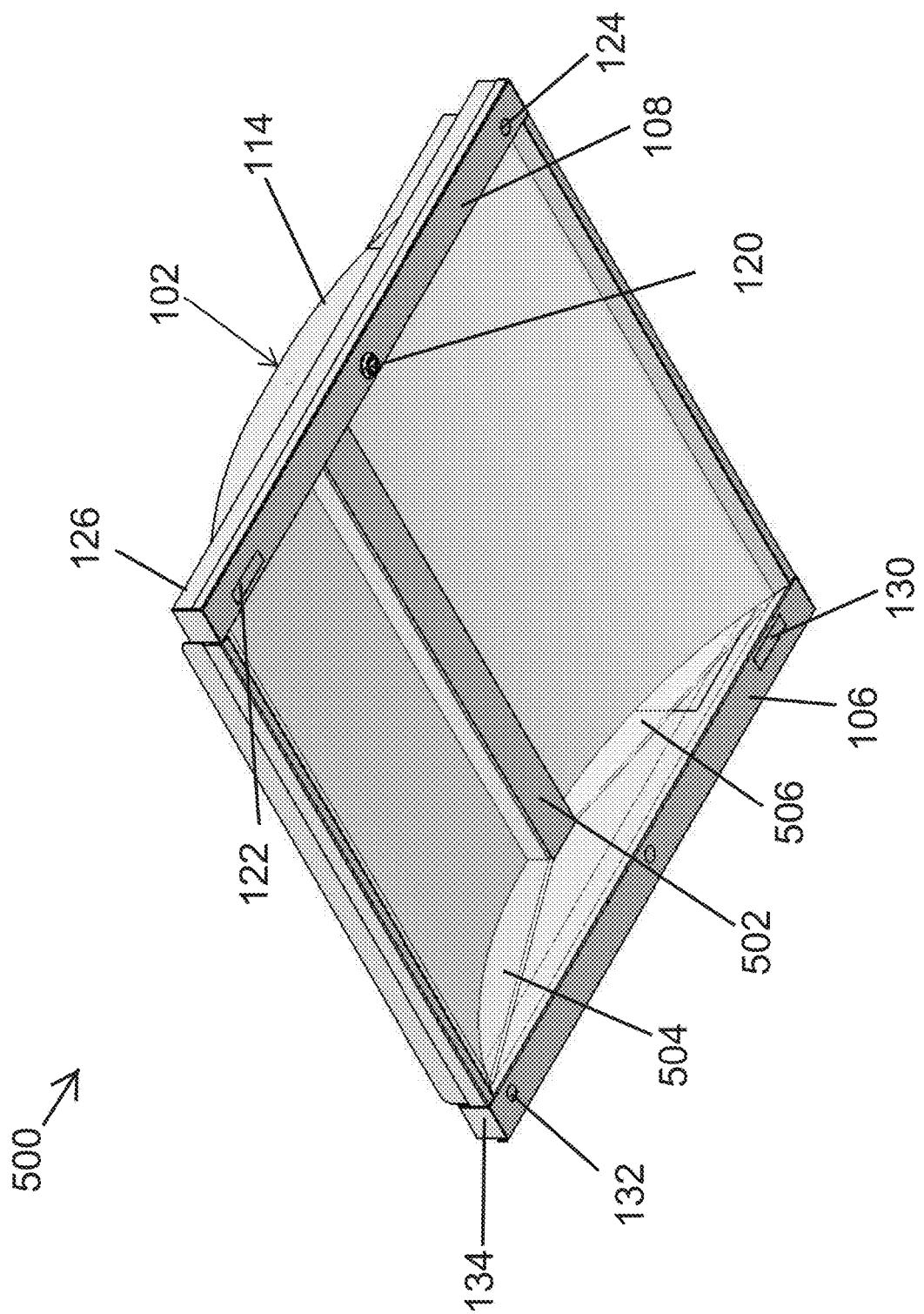
FIGS. 5-7 illustrate different views of a modular troffer luminaire according to another example embodiment.
Figure 6:
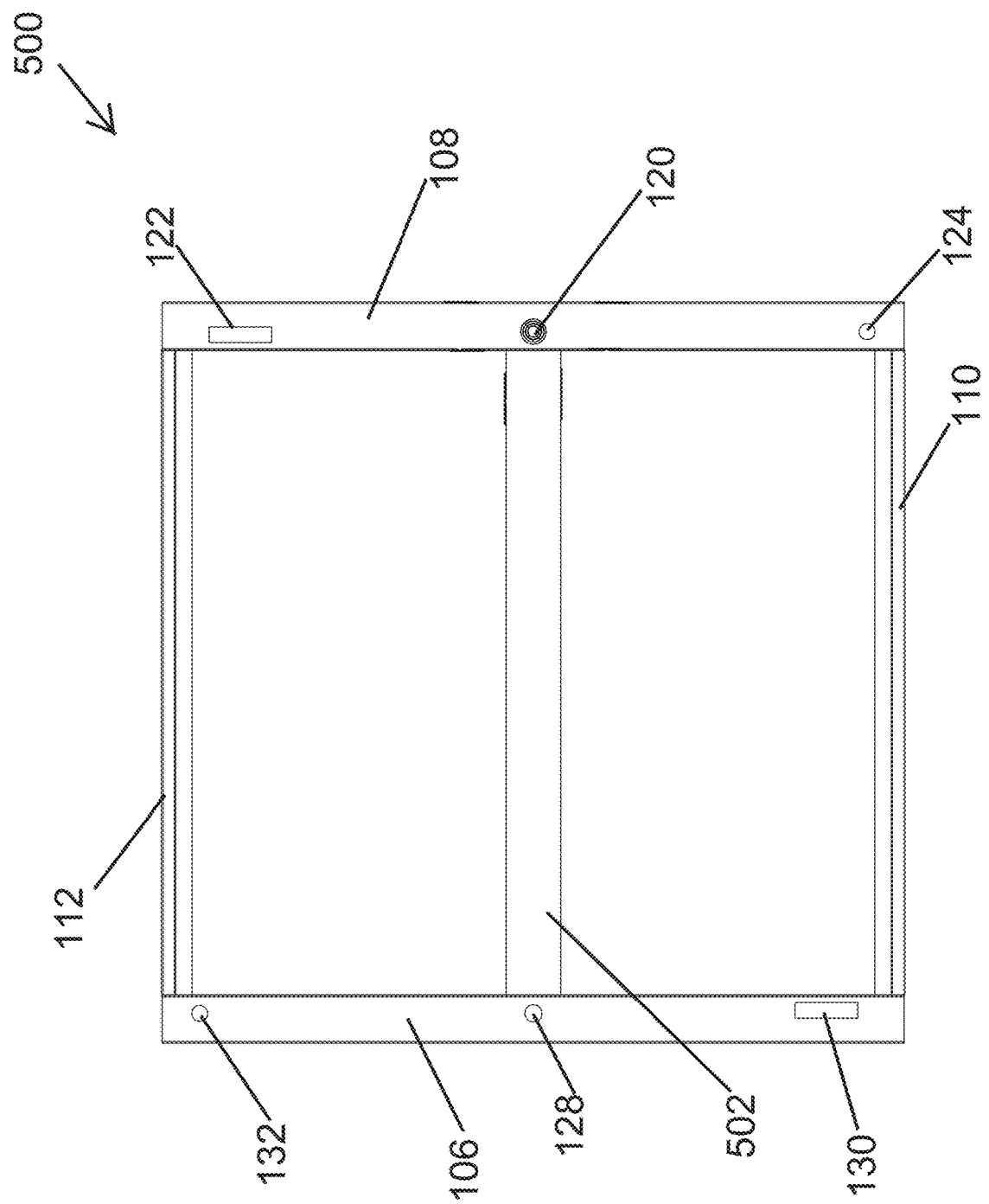
Figure 7:
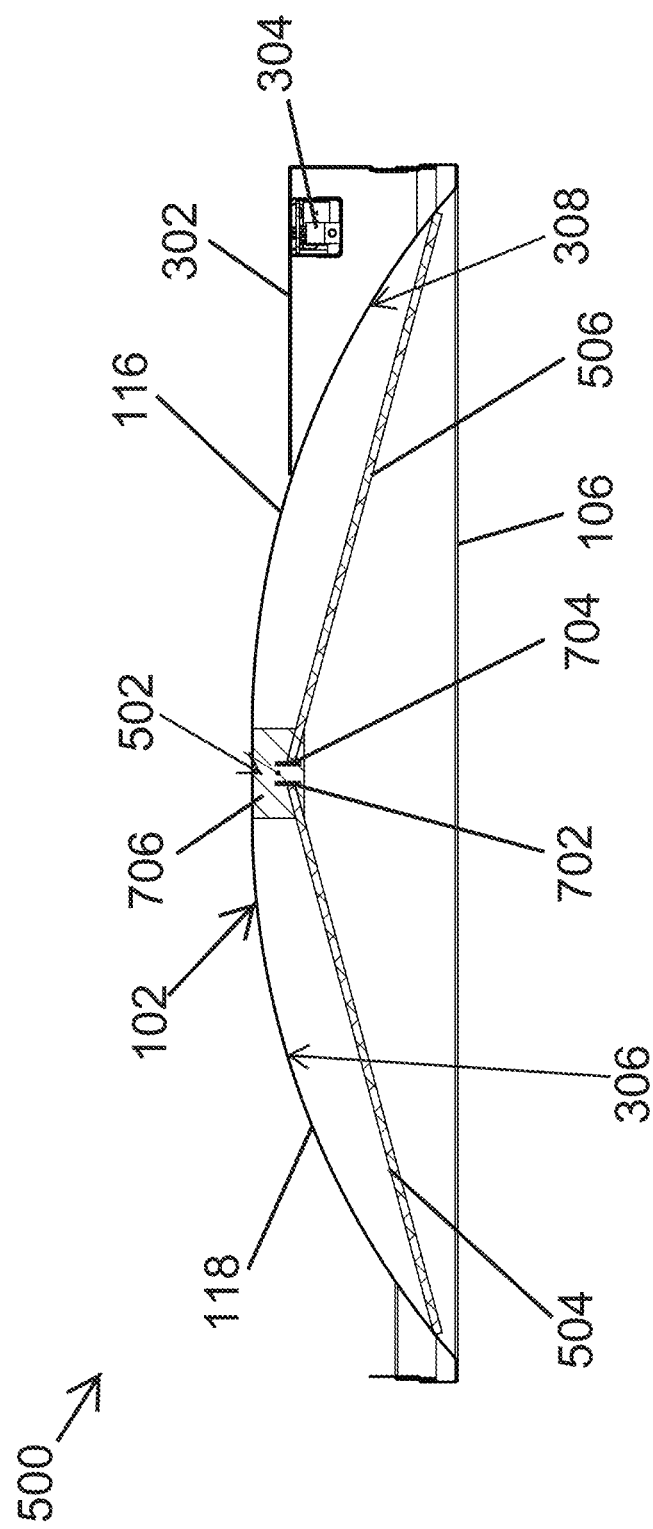

FIG. 5 is a bottom perspective view of a modular troffer luminaire 500 according to another example embodiment, and FIG. 6 is a bottom view of the modular troffer luminaire 500 of FIG. 5 according to an example embodiment. FIG. 7 is a cross-sectional view of the modular troffer luminaire 500 of FIG. 5 according to an example embodiment. Referring to FIGS. 1-7, the luminaire 500 includes the housing 102 and a light module 502. With the exception of the light module 502, the luminaire 500 is substantially the same as the luminaire 100 of FIGS. 1-4B.

For example, the luminaire 500 may be the luminaire 100 after the light module 104 is replaced by the light module 502, which may be a replaceable light module. The light module 502 may provide a different light distribution and luminosity level than the light module 104 of the luminaire 100. Alternatively, the luminaire 500 may be a luminaire that includes the light module 502 for the initial installation of the luminaire 500, where the light module 502 is replaceable by the light module 104 or another light module at a later time. The light module 502 may be removably attached to the back cover 114, for example, by fasteners that extend through the back cover 114. Alternatively or in addition, the light module 502 may be attached to back cover 114 with features such as tabs and slots that allow attachment by sliding and locking into position.

As illustrated in FIGS. 5-7, the light module 502 includes light emitting panels 504, 506 and light sources 702, 704. The light emitting panels 504, 506 extend away in opposite directions from a center panel 706 of the light module 502. The light source 702 is positioned to emit a light into the light emitting panel 504 at a narrow side of the light emitting panel 504 such that a substantial portion of the light is emitted out through the broad side of the panel 504. The light source 704 is positioned to emit a light into the light emitting panel 506 at a narrow side of the light emitting panel 506 such that a substantial portion of the light is emitted out through a broad side of the panel 506. The reflective surfaces 306, 308 may reflect back light toward the panels 504, 506 such that the lights from the light sources 702, 704 are emitted mostly downward from the luminaire 500. In some example embodiments, the light sources 702, 704 may each be the same type as or similar to the light source 136 without departing from the scope of this disclosure. The light module 502 may be controlled based on the sensing information from the sensor 120 and/or from other devices that may be added to the luminaire 500.

In some example embodiments, the sensor 120 may be replaced and other devices (e.g., other sensors, camera, etc.) may be added to the luminaire 500 in a similar manner as described above with respect to the luminaire 100. The wiring and other aspects as the luminaire 100 described above are also applicable to the luminaire 500.

In some example embodiments, a building may include one or more luminaires 500, and the light module 502 may be replaced by another light module, such as the light module 104, for example, to meet the lighting preference of a new owner or tenant without having to replace the entire luminaire 500. Further, the sensor 120 may be replaced by a better sensor, another type of sensor, a non-sensor device, etc., and another sensor or device may be added at one or more of the knockout sections 122, 124, 128, 130, 132 in the same manner as described above. For example, the non-sensor device may be an indicator light source. To illustrate, the indicator light source may emit one or more lights that indicate the status of a sensor of the luminaire 500 and/or other conditions.

Figure 8:
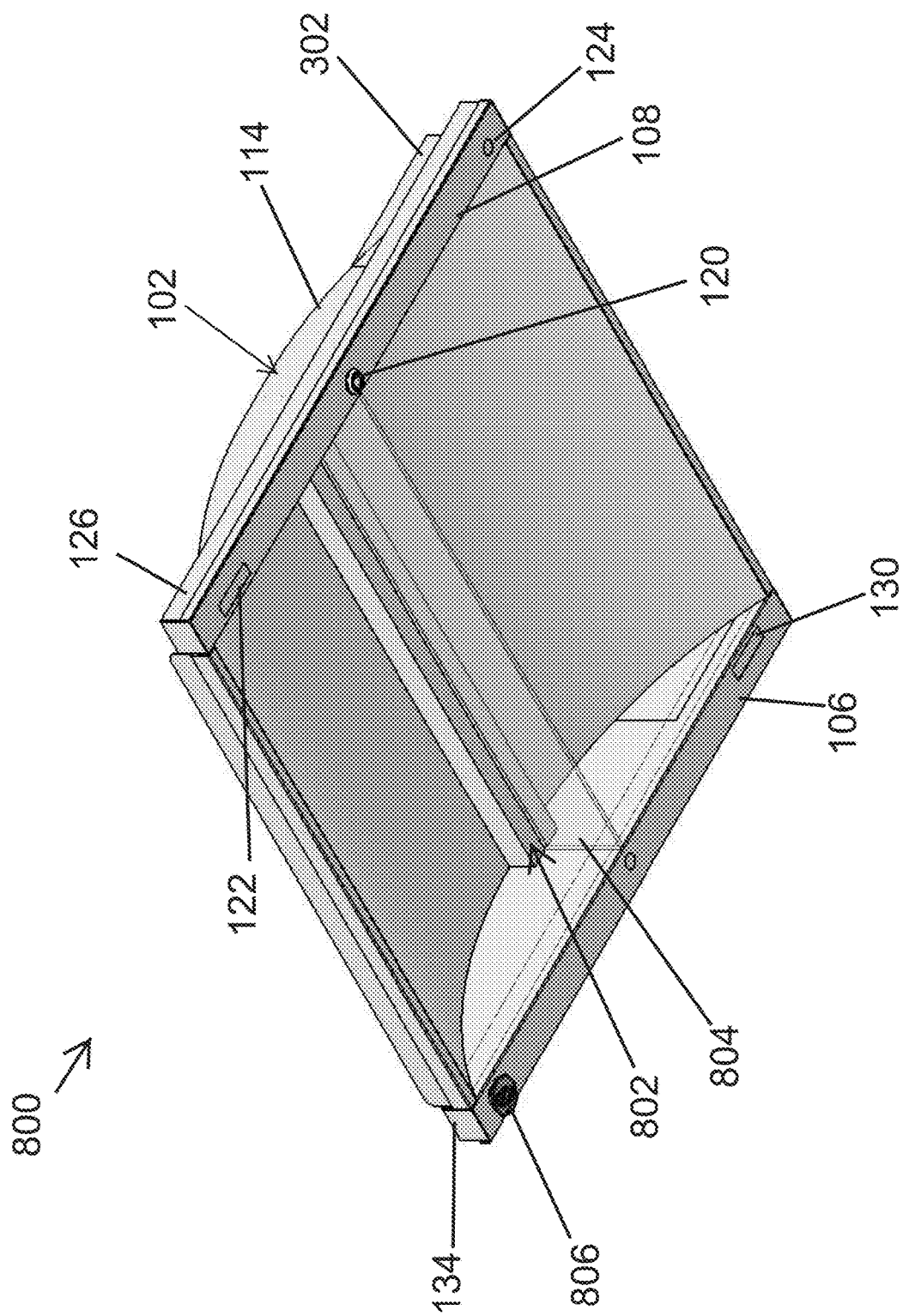
FIGS. 8-10 illustrate different views of a modular troffer luminaire according to another example embodiment.
Figure 9:
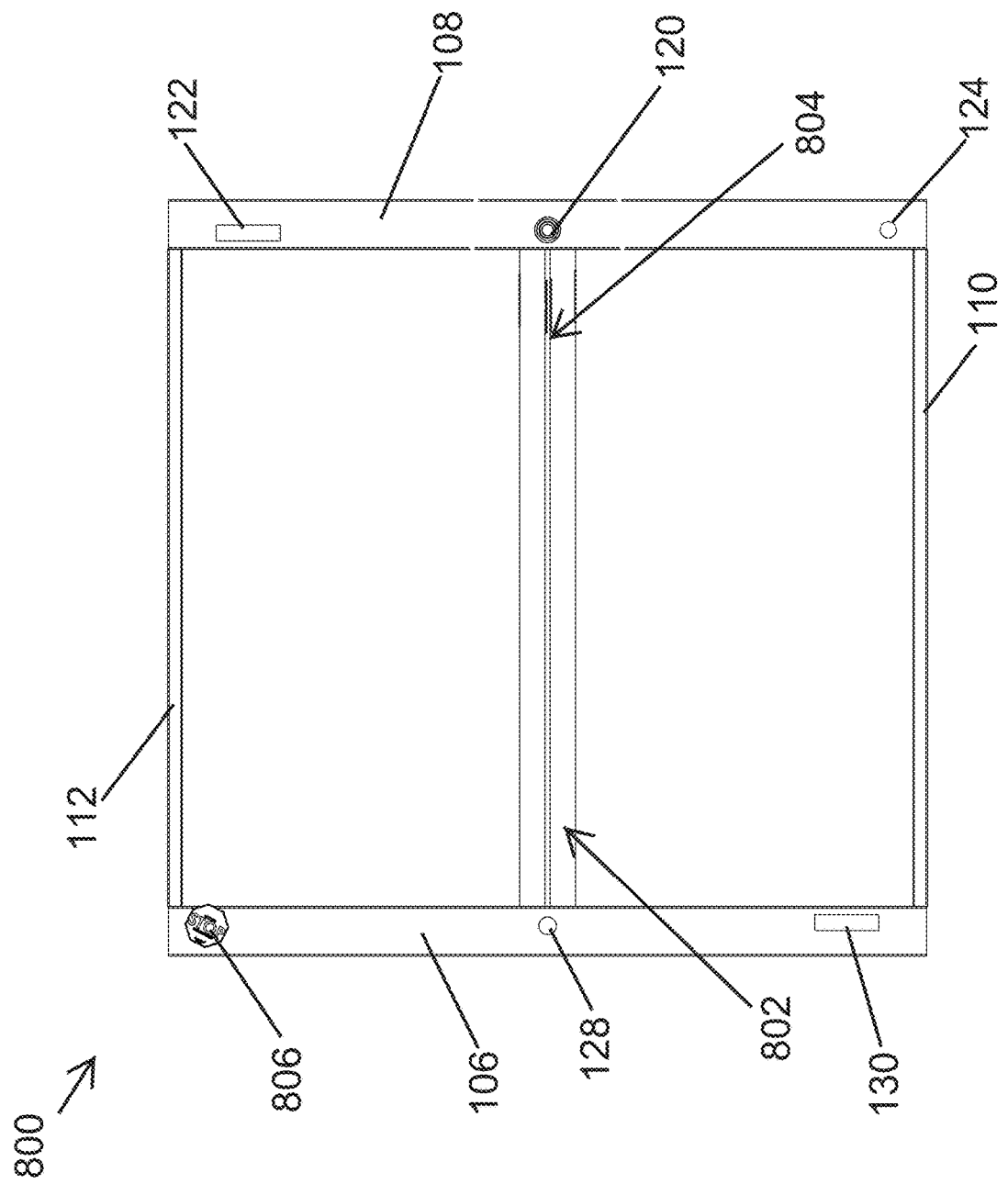
Figure 10:
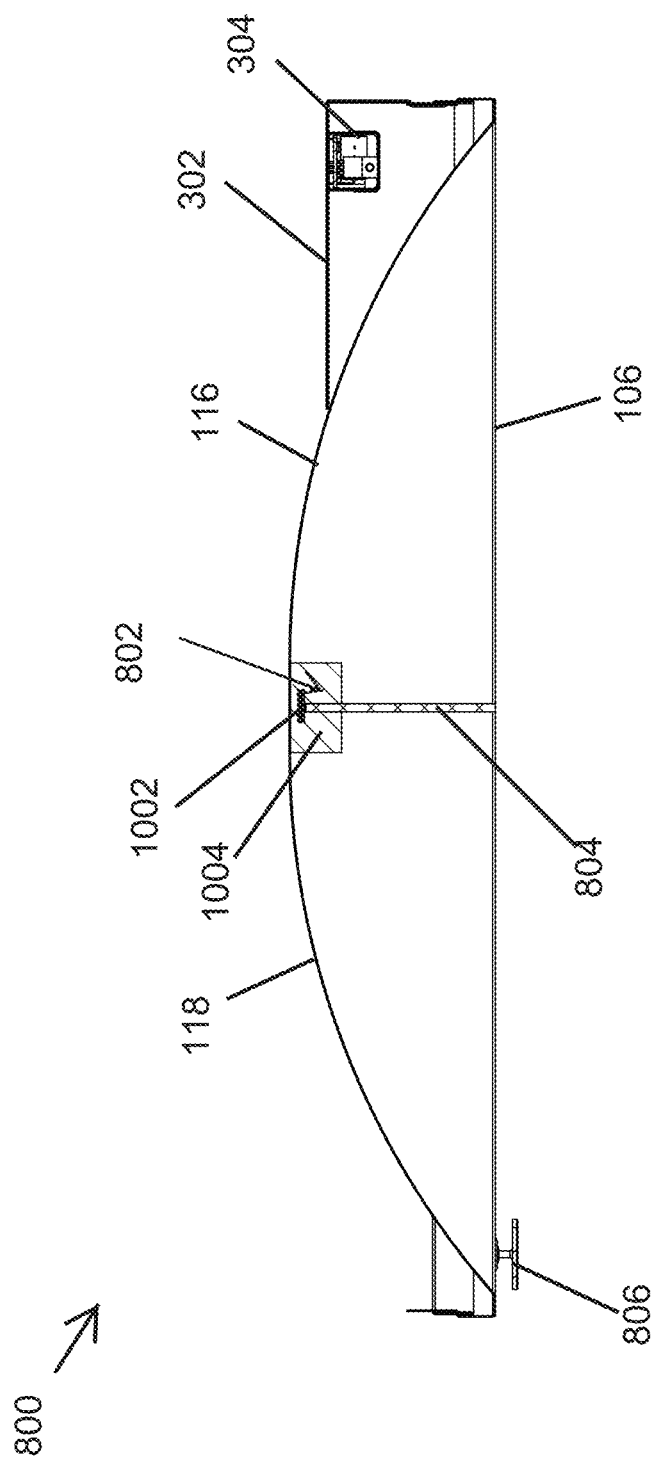

FIG. 8 is a bottom perspective view a modular troffer luminaire 800 according to another example embodiment, and FIG. 9 is a bottom view of the modular troffer luminaire 800 of FIG. 8 according to an example embodiment. FIG. 10 is a cross-sectional view of the modular troffer luminaire 800 of FIG. 8 according to an example embodiment. Referring to FIGS. 8-10, the luminaire 800 includes the housing 102 and a light module 802. With the exception of a device 806 and the light module 802, the luminaire 800 is substantially the similar to the luminaire 100 of FIGS. 1-4B and the luminaire 500 of FIGS. 5-7.

For example, the luminaire 800 may be the luminaire 100 after the light module 104 is replaced by the light module 802, which is a replaceable light module that is different from the light module 104. Alternatively, the luminaire 800 may be the luminaire 500 after the light module 502 is replaced by the light module 802. The light module 802 may provide different light distribution and luminosity levels than the light module 104 of the luminaire 100 and the light module 502 of the luminaire 500. The light module 802 may be removably attached to the back cover 114, for example, by fasteners that extend through the back cover 114. Alternatively or in addition, the light module 802 may be attached to back cover 114 with features such as tabs and slots that allow attachment by sliding and locking into position.

In some example embodiments, the sensor 120 may be replaced and other devices (e.g., other sensors, camera, etc.) may be added to the luminaire 800 in a similar manner as described above with respect to the luminaires 100 and 500. The wiring and other aspects as the luminaire 100 described above are also applicable to the luminaire 800.

In some example embodiments, the light module 802 may be controlled based on the sensing information from the sensor 120 and other devices that may be added to the luminaire 800. The luminaire 800 may also include a device 806 that is attached to the end frame 106. For example, the device 806 may be attached to the end frame 106 after removing the knockout section 132 shown in FIGS. 1 and 5. The device 806 may be coupled to the driver 304 or to another component in the electronics compartment 302 in a similar manner as described with the sensor 120.

In some example embodiments, a building may include one or more luminaires 800, and the light module 802 of the one or more luminaires 800 may be replaced by another light module, such as the light module 104 or the light module 502, for example, to meet the lighting preference of a new owner or tenant without having to replace the entire luminaire 800. Further, the sensor 120 and the device 806 may each be replaced by another sensor or non-sensor device. Further, another sensor or device may be added at one or more of the knockout sections 122, 124, 128, 130 in the same manner as described above.

Figure 11:
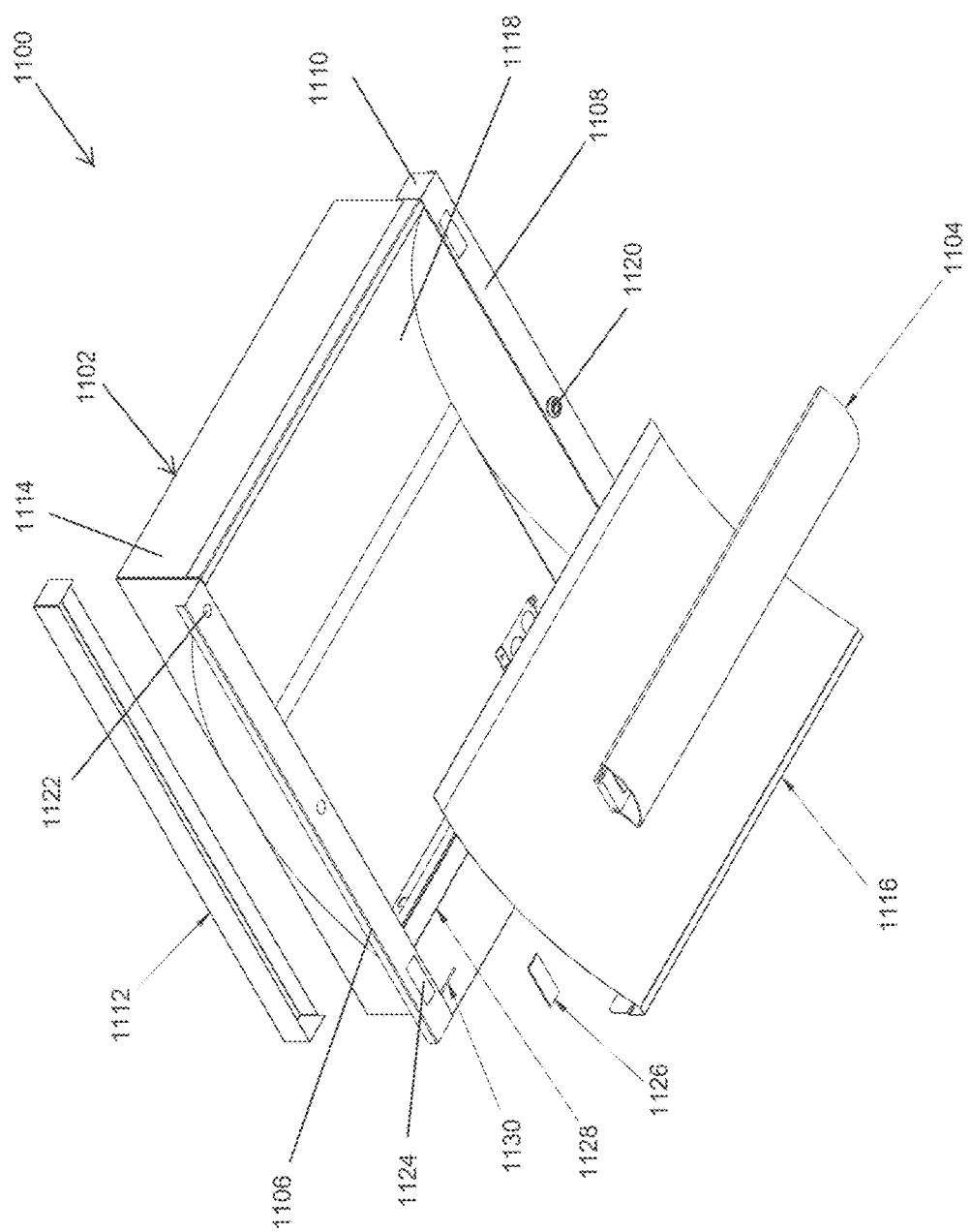
FIGS. 11 and 12 illustrate partially exploded views of a modular troffer luminaire according to another example embodiment.
Figure 12:
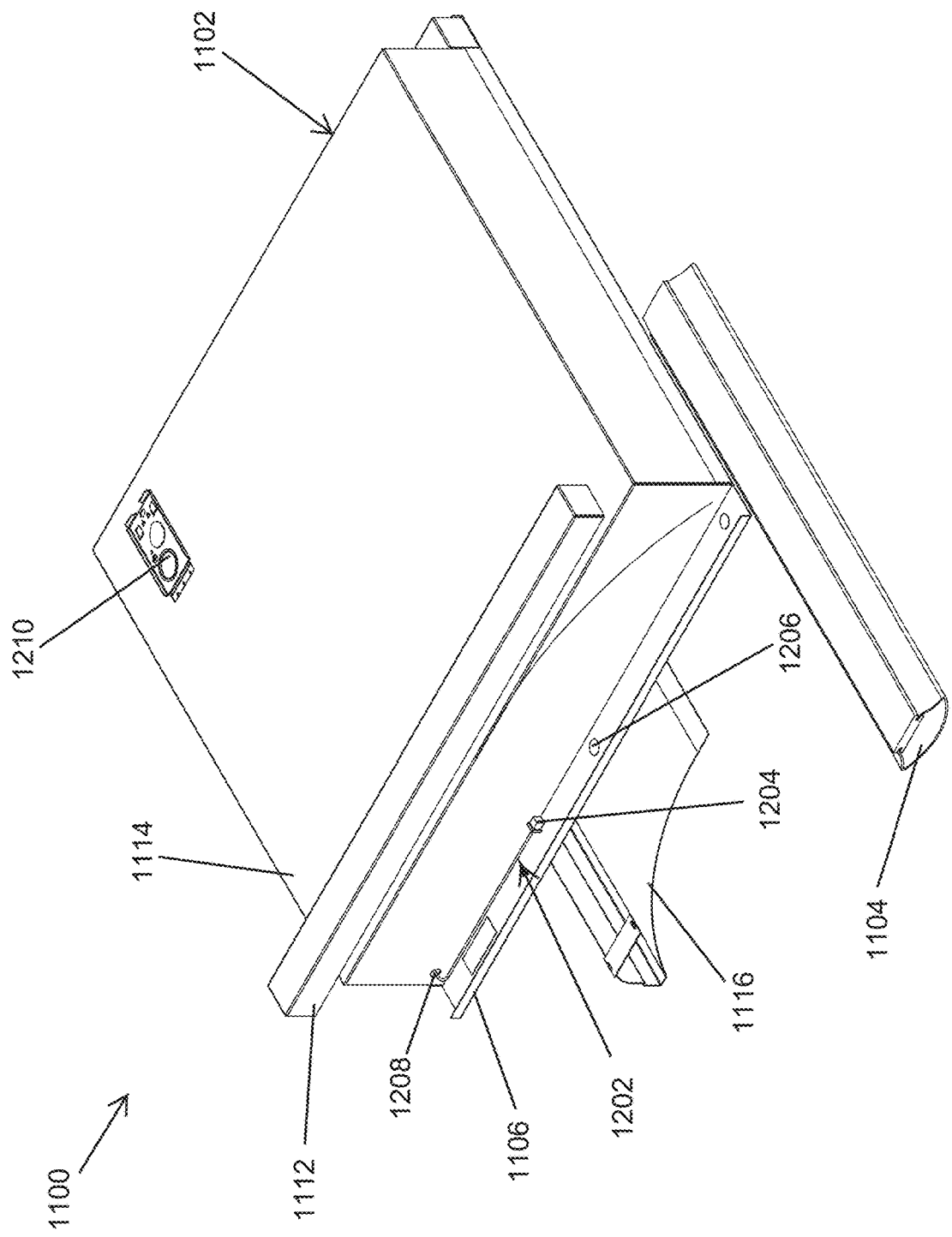

FIGS. 11 and 12 illustrate partially exploded views of a modular troffer luminaire 1100 according to another example embodiment. In some example embodiments, the modular troffer luminaire 1100 includes a housing 1102 and a light module 1104. The lighting module 1104 may be the same type as the light module 104 described above. In some alternative embodiments, the luminaire 1100 may include another type of light module such as light module 502, 802, instead of the light module 1104. The light module 1104 is a replaceable light module that may be replaced by another light module after installation of the luminaire 1100. The housing 1102 may include end frames 1106, 1108 and a cover 1114 that provides an enclosure on the back side of the housing 1102. For example, the back cover 1114 may be recessed behind a ceiling when the luminaire 1100 is installed.

In some example embodiments, the luminaire 1100 may include reflectors 1116, 1118 that are positioned in a cavity of the housing 1102 below the back cover 1114. The light module 1104 may be positioned in a gap between the first reflector 1116 and the second reflector 1118. The light module 1104 may be removably attached to the back cover 1114, for example, by fasteners that extend through the back cover 1114. Alternatively or in addition, the light module 1104 may be attached to back cover 1114 with features such as tabs and slots that allow attachment by sliding and locking into position. Alternatively, molded features could be included to allow for snap-and-lock attachment of the light module 1104 into position and the release from the back cover 1104 may be performed with a hand squeeze or a tool insertion.

In some example embodiments, the luminaire 1100 may include a cavity between the back cover 1114 and the reflector 1116 and another cavity between the back cover 1114 and the reflector 1118. One or both cavities may be used for holding equipment such as a driver. For example, a driver 1128 (e.g., an LED driver that may have other power ports) may be positioned in the cavity between the reflector 1116 and the back cover 1114 and may provide power (e.g., DC power) to the light module 1104. Input power (e.g., AC power) may be provided to the driver 1128 by electrical wires that are routed through one or more openings 1210. To illustrate, the driver 1128 may be accessible by removing the reflector 1116. The driver 1128 may be attached to the back cover 1114 by one or more fasteners or other means as may be contemplated by those of ordinary skill in the art with the benefit of this disclosure.

In some example embodiments, the driver 1128 may provide power to the light module 1104 as well as the other devices such as a sensor 1120 and other devices (other sensors, a camera, etc.) that may be added after installation of the luminaire 1100. To illustrate, the end frames 1106, 1108 include knockout sections similar to the end frames 106, 108 that can be used to add sensors, cameras, etc. after installation of the luminaire 1100 in a similar manner as described above with respect to the luminaires 100, 500, 800. For example, the luminaire 1100 may include electrical cables/wires that are routed between the driver 1128 or another component (e.g., a control pack) and the end frames 1106, 1108 to provide power to devices that are added to the luminaire 1100 after installation, for example, by a new tenant. The cables may also be used for communication between the driver 1128 or another device and one or more existing devices or devices that are added to the end frames 1106, 1108. For example, an electrical cable such as the cable 406 may be routed to the sensor 1120 in a similar manner as shown in FIG. 4.

In some example embodiments, the luminaire 1100 may include a spare low voltage electrical cable 1130 (e.g., a twisted pair or a CAT 5e) that is routed to the end frame 1106 but initially left unused/unconnected. The cable 1130 can be used to provide power and for communication with a sensor, a camera, or another device that is added to the end frame 1106 after installation of the luminaire 1100. For example, the cable 1130 may include a connector 1204 (e.g., an RJ45 connector) and may be used to connect to a newly added device at the location of the knockout 1122, 1206 or another knockout of the end frame 1106. The cable 1130 may be routed between the driver 1128 or another device and the end frame 1106 through an opening 1208 in the back cover 1114 of the housing 1102. In some example embodiments, more than one spare cable may be routed to each one of the end frames 1106, 1108 prior to the installation of the luminaire 1100. Alternatively, no electrical cable other than cables used with existing devices, such as the sensor 1120, may be included at the time of installation of the luminaire 1100. One or more spare electrical cables may be routed in the luminaires 100, 500, 800 in a similar manner as the cable 1130.

In some example embodiments, the luminaire 1100 may include channel structures 1110, 1112 that allow routing electrical cables therethrough. For example, the channel structures 1110, 1112 may correspond to the channel structures 126, 134 described above. In some example embodiments, the luminaire 1100 may also include a receptacle that is similar to and that can be used for the same purposes as the receptacle 412 described above with respect to FIGS. 4A and 4B.

In some example embodiments, the sensor 1120 could be mounted to a molded plate that snaps into a hole in the end frame 1108. After installation of the luminaire 1100, a replacement sensor or device may be mounted on a plate that snaps in from below the end frame 1108 allowing the replacement of the sensor 1120 without the need to access the plenum space. In general, a new sensor or device may be mounted on a plate that snaps in from the below the end frame 1106, 1108 allowing the addition of the new sensor or other device to the luminaire 1100 without the need to access the plenum space. In some example embodiments, a blank molded plate 1126 may be used to fill a hole 1124 left behind in the end frame 1106 when a device (e.g., a sensor or a camera) previously placed at the hole 1124 is removed but not replaced by another device. In some alternative embodiments, blank molded plates that snap in matching holes in the end frames 1106, 1108, may be used as knockout sections.

By providing a light module, a sensor, and other devices that can be replaced after the installation of the modular troffer luminaire 100, 500, 800, 1100, the modular troffer luminaire enables cost effective as well as code-compliant initial installations. The ability to replace the initially installed light module allows a builder and/or owner to accommodate the preferences of a subsequent owner, tenant, etc. or based on an owner's preferences. By enabling the addition of new devices, such as sensors, etc., as well as the option to replace the installed light module, sensor, etc. with different and/or better ones, each modular troffer luminaire 100, 500, 800, 1100 enables a landlord or owner to accommodate the preferences of a subsequent owner, tenant, etc. or the owner's preferences. Costs and complexity that may result from replacing a luminaire that does not support replacement and addition of components can also be avoided by the use of the modular troffer luminaire 100, 500, 800, 1100.

Although particular light modules are shown in FIGS. 1-12, the luminaires 100, 500, 800, 1100 described herein may include other types of light modules without departing from the scope of this disclosure.

Figure 13:
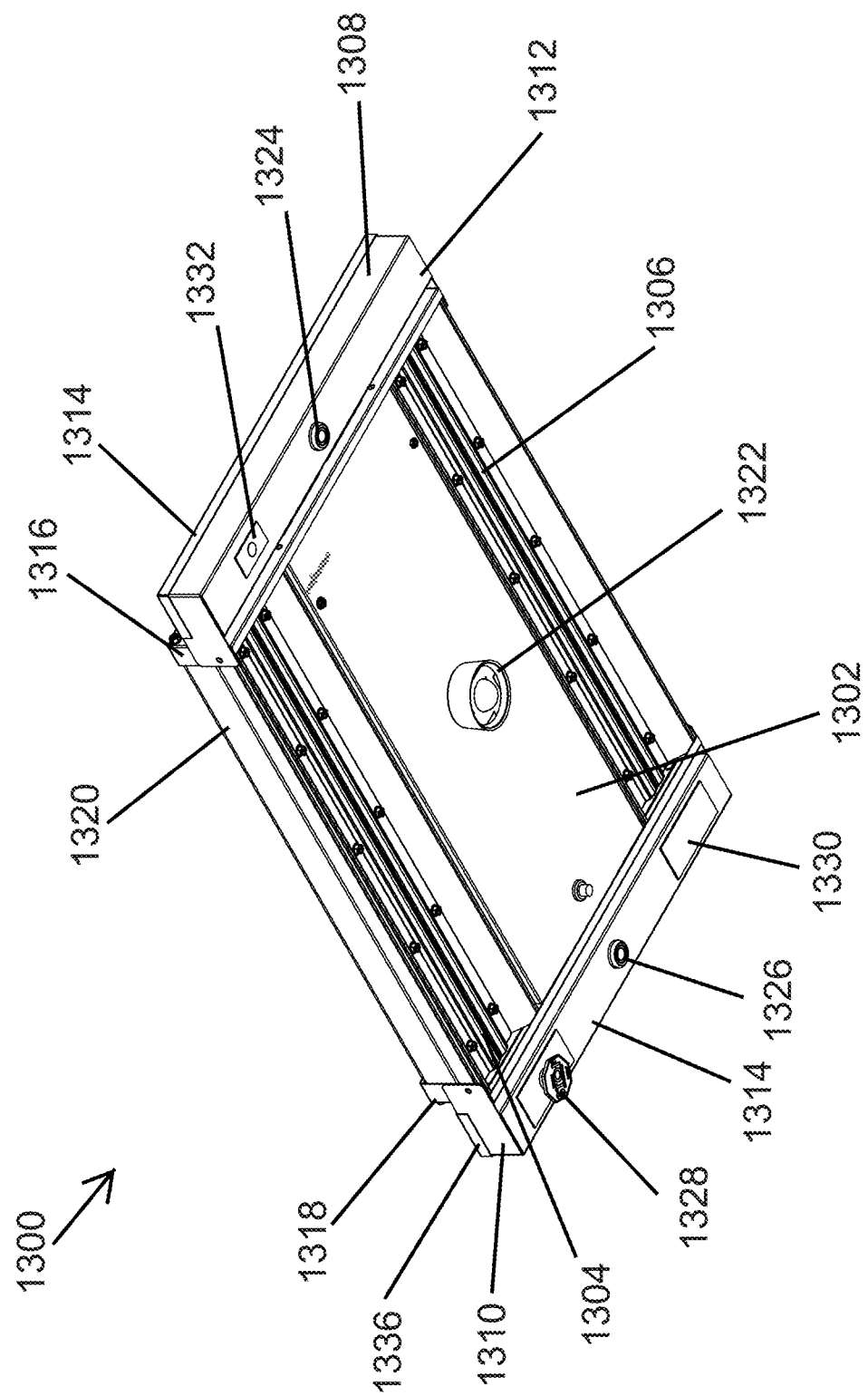
FIG. 13 is a bottom perspective view of a modular high bay luminaire according to an example embodiment.

FIG. 13 is a bottom perspective view of a modular high bay luminaire 1300 according to an example embodiment. In some example embodiments, the luminaire 1300 includes a housing 1302 and light modules 1304, 1306. An enclosure 1308 is attached to the housing 1302 at one end of the housing 1302, and an enclosure 1310 is attached to the housing 1302 at the opposite end of the housing 1302. The housing 1302 is between the enclosures 1308, 1310. In some example embodiments, the housing 1302 may include end panels 1316, 1318, and the enclosure 1308 may be attached to the end panel 1316, and the enclosure 1310 may be attached to the end panel 1318. Alternatively, the end panels 1316, 1318, may be attached to the housing 1302 instead of being part of the housing 1302.

In some example embodiments, the luminaire 1300 includes a heat sink 1320 that is positioned to dissipate heat from the light module 1304. For example, the heat sink 1320 may extend between the end panels 1316, 1318. Another heat sink 1420, shown more clearly in FIG. 14, may also be positioned to dissipate hear from the light module 1306.

In some example embodiments, the enclosure 1308 may include a base section 1312 and a removable cover 1334 that encloses a cavity of the enclosure 1308. A device 1332 may be positioned in the enclosure 1308 such that the device 1332 is exposed through a rectangular opening in the base section 1312 of the enclosure 1308. For example, the device 1332 may be a plug and play camera or a sensor, such as a motion or daylight sensor. Another device 1324 is also positioned in the enclosure 1308 such that the device 1324 extends through a round opening in the base section 1312 of the enclosure 1308. For example, the device 1324 may be a motion sensor.

In some example embodiments, the enclosure 1310 may include a base section 1314 and a removable cover 1336 that encloses a cavity of the enclosure 1310. A device 1326 is positioned in the enclosure 1310 such that the device 1326 extends through a round opening in the base section 1314 of the enclosure 1310. For example, the device 1324 may be a motion sensor, a daylight sensor, smoke detector, temperature sensor, humidity sensor, an asset tracking device, an indoor positioning device, etc. Another device 1328 may also be at least partially positioned in the enclosure 1310 such that the device 1328 is exposed through a rectangular opening in the base section 1314 of the enclosure 1310. For example, the device 1328 may be a test switch, a sensor, etc. To illustrate, the light modules 1304, 1306 may be controlled based on the sensing or lighting control information from the device 1328 and/or another one or more of devices 1324, 1326, 1332.

In general, the devices 1324, 1326, 1328, 1332 may be replaced with another device of the same type or with a different type of device. For example, the device 1332 may be a motion sensor and may be replaced by another motion sensor, a daylight sensor, or a camera that covers or fittingly extends through the rectangular hole in the base section 1312 covered by the device 1332. As another example, the device 1326 may be a camera and can be replaced by another camera, a daylight sensor, or an asset tracking device that covers or fittingly extends through the round hole in the base section 1314 covered by the device 1326. In some example embodiments, one or more of the devices 1324, 1326, 1328, 1332 may be replaced with another device that adds remote lighting control capability to the luminaire 1300 or that upgrades or otherwise changes the remote lighting control capability to the luminaire 1300. For example, a replacement device may be a connectivity module that adds to the luminaire 1300 a wireless communication capability that is based on a standard such as ZigBee, Bluetooth, VLC, etc.

In some example embodiments, the enclosure 1310 may include a knockout section 1330 that can be removed to form a hole in the base section 1314. For example, the knockout section 1330 may be removed by applying a force on the knockout section 1330 and without the need to cut through the base section 1314. Removing the knockout section 1330 may leave a rectangular hole in the base section 1314 of the enclosure 1310. A device such as a camera, a sensor, etc. may be attached to the base section 1314 through the hole formed by removing the knockout section 1330. Although the knockout section 1330 has a rectangular shape as shown in FIG. 13, in alternative embodiments, the knockout section 1330 may have other shapes, such as a round shape, without departing from the scope of this disclosure. Further, in some example embodiments, the enclosure 1310 may include additional knockout sections in the base section 1312 and/or 1314 than shown in FIG. 13 without departing from the scope of this disclosure.

In some example embodiments, a power supply, such as an LED driver, may be positioned in the housing 1302. The power supply in the housing 1302 may provide power to the devices 1324, 1332 using low voltage electrical wires extending through the enclosure 1308. The power supply may also provide power to the devices 1326, 1328 using low voltage electrical wires extending through the enclosure 1310. Replacement and additional devices that are placed in the enclosures 1308, 1310 may also be powered using the existing (used or spare) or newly added low voltage wires extending through the enclosures 1308, 1310.

In some example embodiments, sensor or other information may be communicated between the devices 1324, 1326, 1328, 1332 or newly added or replacement devices using one or more electrical wires routed through the respective one of the enclosures 1308, 1310. Alternatively, one or more of the devices positioned in the enclosures 1308, 1310 may receive power using the electrical wires and may communicate wirelessly. For example, the device 1324 may be a motion sensor that is powered by the power supply in the housing 1302 and that may wirelessly transmit sensor information, for example, to a wireless control device or a driver.

In some example embodiments, the luminaire 1300 may also include a sensor 1322, such as a motion sensor, or another device that is positioned in the housing 1302 and that extends through an opening in the housing 1302. The sensor 1322 may operate along with the devices positioned in the enclosures 1308, 1310.

In some alternative embodiments, the luminaire 1300 may have fewer or more devices than shown without departing from the scope of this disclosure. The luminaire 1300 may also have light modules that are positioned differently than shown without departing from the scope of this disclosure. In some alternative embodiments, the luminaire 1300 may have fewer or more knockout sections than shown without departing from the scope of this disclosure. In some example embodiments, the devices 1324, 1326, 1328, 1332, and the knockout section 1330 may be at different locations than shown without departing from the scope of this disclosure. In some alternative embodiments, the housing 1302 may have a different shape than shown without departing from the scope of this disclosure.

Figure 14:
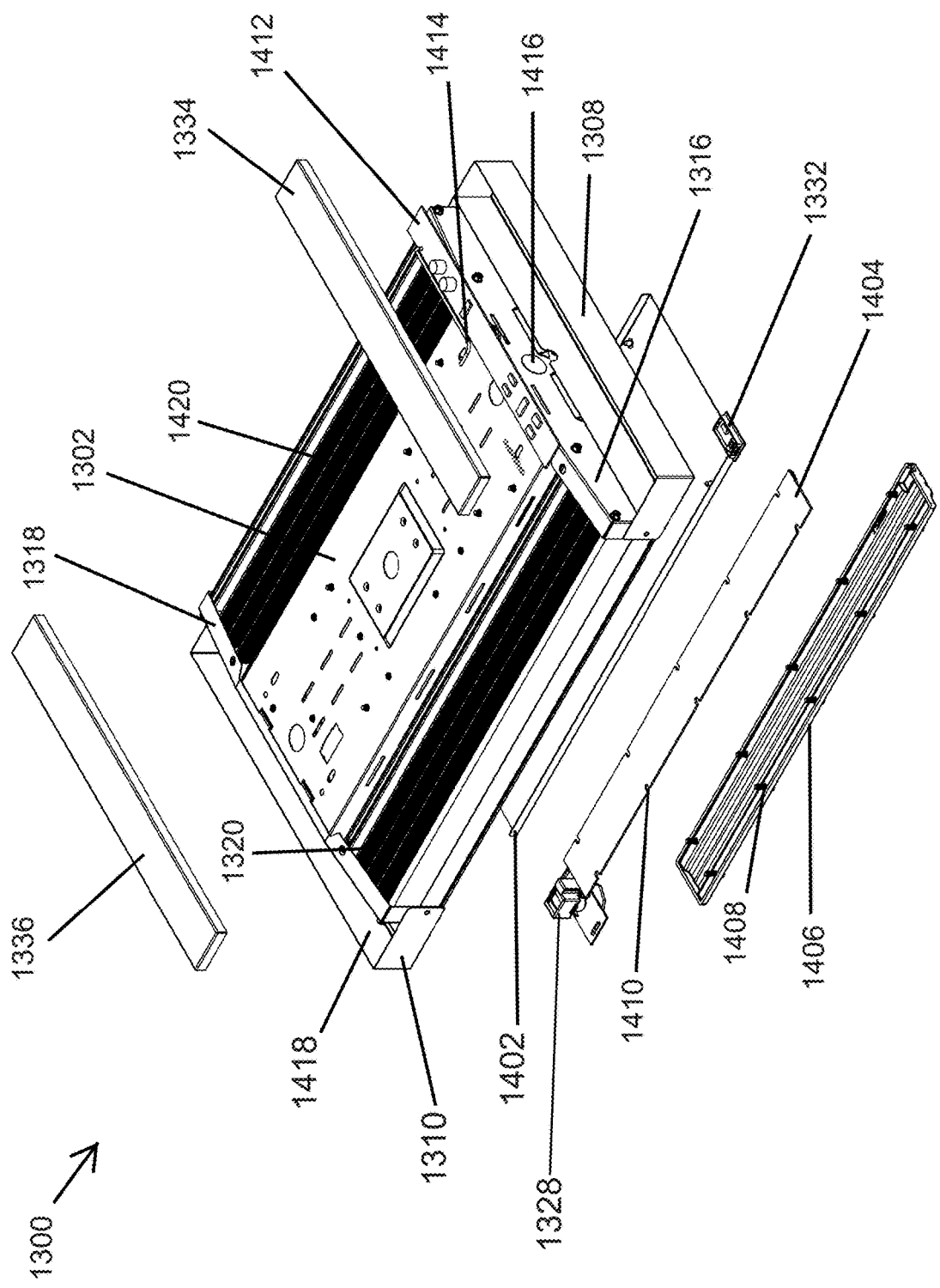
FIG. 14 is a top perspective partially exploded view of the modular high bay luminaire of FIG. 13 according to an example embodiment.

FIG. 14 is a top perspective partially exploded view of the modular high bay luminaire 1300 of FIG. 13 according to an example embodiment. Referring to FIGS. 13 and 14, the housing 1302 may include a front cover 1402 covering a cavity of the housing 1302 from below the luminaire 1300. The light module 1304 includes an LED light source 1404 and an optic 1406 that can be attached to the LED light source 1404 by fasteners 1408. Each fastener 1408 may fit in a respective slot of the slots 1410 to attach the optic 1406 to the LED light source 1404. The fasteners 1408 may also be used to attach the light source 1404 and the optic 1406 to the heat sink 1320 that may itself be attached to the end panels 1316, 1318. In some example embodiments, the light module 1306 may also include an LED light source and an optic that are attached to each other and to a heat sink 1420 in a similar manner as described with respect to the light module 1304.

In some example embodiments, the luminaire 1300 may initially be installed with the LED light source 1404, and a subsequent occupant or owner may replace the LED light source 1404 by another LED light source that has emits a light with a different luminosity level, color temperature, controllability, etc. The optic 1406 may also be replaced after the initial installation of the luminaire 130, for example, based on the light distribution, appearance, etc. preference of a new tenant, etc. The replacement light source and optic may also be subsequently replaced with another light source and optic. The LED light source and the optic of the light module 1306 may also be replaced by replacement light source and optic.

In some example embodiments, the end panel 1316 may include one or more openings 1416 for routing electrical wires between the housing 1302 and the cavity of the enclosure 1308. For example, the device 1324 may include a print circuit board (PCB) 1412 that is disposed in a cavity of the enclosure 1308. One or more electrical wires 1414 may be routed between a power supply inside the housing 1302 and the PCB 1412 through the opening 1416. For example, the one or more wires 1414 may be routed inside the enclosure 1308 and may be connected to the PCB 1412. To illustrate, the device 1324 may be attached to the PCB 1412 and the power supply inside the housing 1302 may provide power to the device 1324.

In some example embodiments, the electrical wire 1414 may include a connector (e.g., an RJ45 connector) that can be coupled to a mating connector of the power supply. For example, the electrical cable 1414 may be a CAT 5 cable, a CAT 6 cable, strands of electrical wires, a telephone wire, or another suitable wire that can be used to provide low voltage power to the device 1324.

In some example embodiments, the device 1324 may also communicate with the power supply or another device inside the housing 1302 using the one or more wires 1414. The devices 1326, 1328, 1332 and replacement or later added devices may also be powered or may communicate using wires that are routed in a similar manner as the wires 1414. To illustrate, the devices 1326, 1328 that are positioned in a cavity 1418 of the enclosure 1310 may be connected to the power supply or another device inside the housing in a similar manner as the device 1324.

Figure 15:
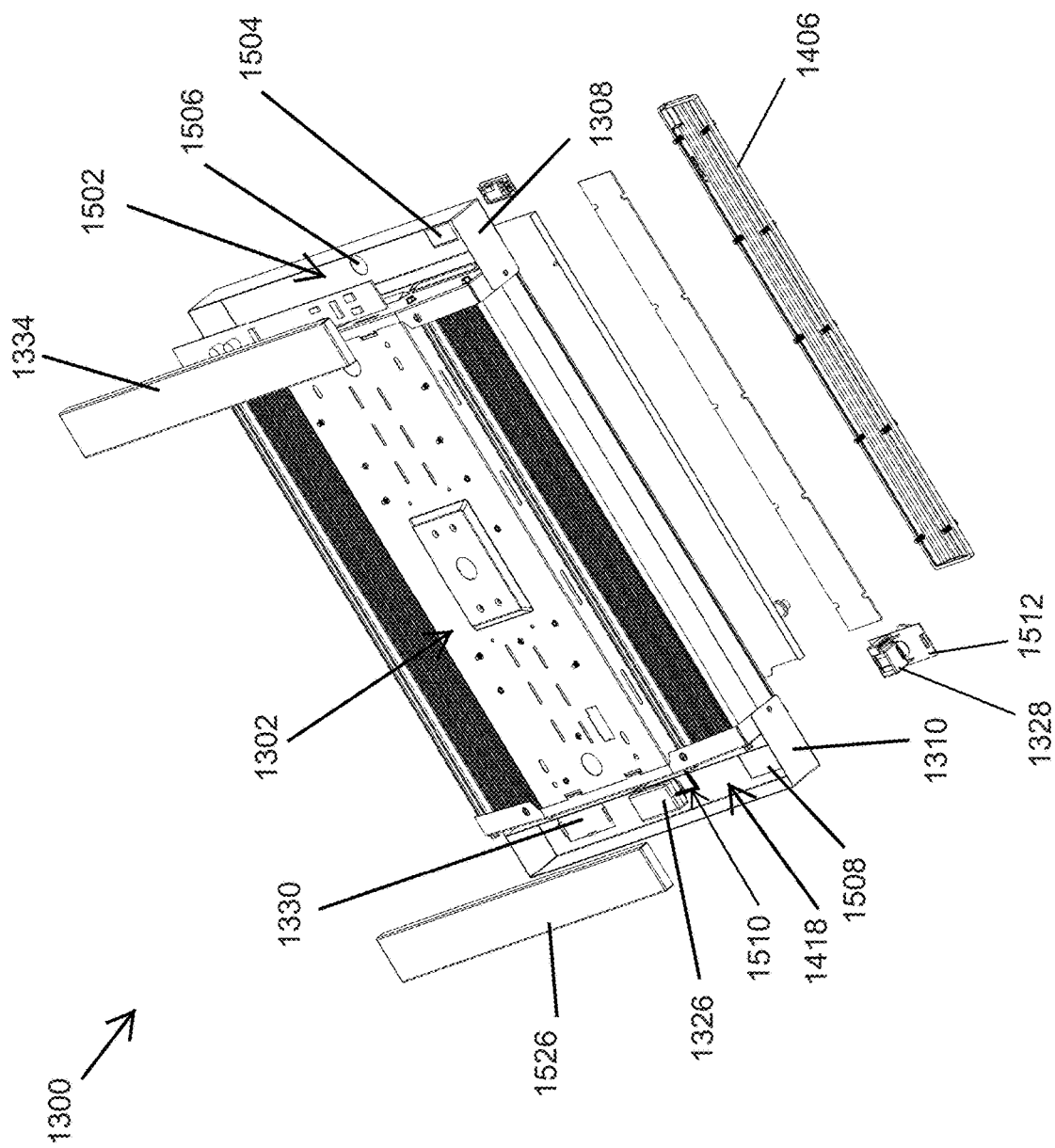
FIG. 15 is another top perspective partially exploded view of the modular high bay luminaire of FIG. 13 according to an example embodiment.

FIG. 15 is another top perspective partially exploded view of the modular high bay luminaire 1300 of FIG. 13 according to an example embodiment. Referring to FIGS. 13-15, the device 1326 is positioned in the cavity 1418 of the enclosure 1310. For example, one or more electrical wires 1510 may be routed through the enclosure 1310 between the device 1326 and the power supply or another device inside the housing 1302.

In some example embodiments, a replacement device may replace the device 1324 and may be positioned in a cavity 1502 of the enclosure 1308 to fit in and/or over a round opening/hole 1506 in the base section 1312 of the enclosure 1308. Similarly, a replacement device may replace the device 1332 and may be positioned in the cavity 1502 to fit in and/or over a rectangular opening/hole 1504 in the base section 1312 of the enclosure 1308.

In some example embodiments, the device 1328 may be attached to a plate 1512 (e.g., a molded plate) that gets attached to the base section 1314 through a hole 1508. For example, the plate 1512 may attach to the base section 1314 by snapping in through the hole 1508. A replacement device that replaces the device 1328 may be positioned to fit in and/or over the hole 1508 in the base section 1314 of the enclosure 1310 after the removal of the device 1328 and the plate 1512. For example, a replacement device (e.g., a sensor, a camera, etc.) may be attached to a plate (e.g., a molded plate with snaps) that snaps in the hole 1508. Alternatively, the replacement device may be attached at the hole 1508 without using a plate. When a replacement device is not attached to the base section 1314 after the device 1328 and the plate 1512 are removed, a blank plate (i.e., a plate without holes for device attachment) may be attached the base section 1314, for example, by snapping in the blank plate through the hole 1508. In some example embodiments, the luminaire 1300 may include removable blank plates instead of one or more of the knockout sections.

Figure 16:
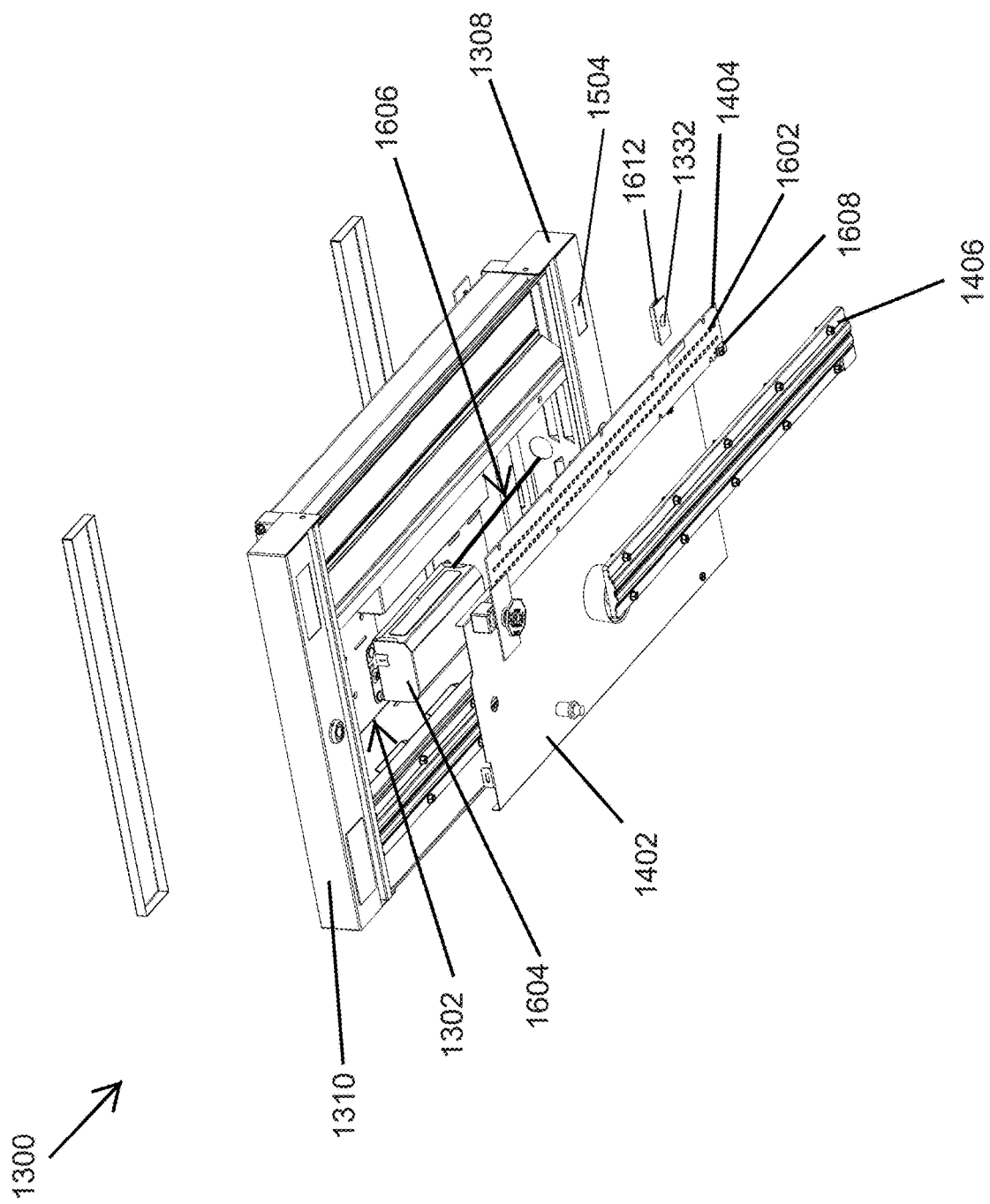
FIG. 16 is a bottom perspective partially exploded view of the modular high bay luminaire of FIG. 13 according to an example embodiment.

FIG. 16 is another bottom perspective partially exploded view of the modular high bay luminaire 1300 of FIG. 13 according to an example embodiment. Referring to FIGS. 13-16, the light source 1404 may include LEDs 1602 that are disposed on a board such as a PCB. For example, the light source 1404 may include one or more discrete light emitting diodes (LEDs), one or more organic LEDs (OLEDs), an LED chip on board that includes one or more discrete LEDs, and/or an array of discrete LEDs. The LED light source 1404 may include a connector 1608 for connecting one or more electrical wires to a power supply 1604 or to another power source. For example, an electrical cable connected to the connector 1608 may get disconnected from the connector 1608 and get reconnected to the connector of a replacement LED light source that is used as a replacement to the LED light source 1404. In some alternative embodiments, the light source 1408 may include an onboard driver that provides power to the LEDs 1602.

In some example embodiments, the device 1332 may be attached to a plate 1612 (e.g., a molded plate) that gets attached to the base section 1312 through a hole 1504. For example, the plate 1612 may be attached to the base section 1312 by snapping it in through the hole 1504. A replacement device that replaces the device 1332 may be positioned to fit in and/or over the hole 1504 in the base section 1312 after the removal of the device 1332 and the plate 1612. For example, a replacement device (e.g., a sensor, a camera, etc.) may be attached to a plate (e.g., a molded plate with snaps) that snaps in the hole 1504. Alternatively, the replacement device may be attached at the hole 1504 without using a plate. When a replacement device is not attached to the base section 1312 after the device 1332 and the plate 1342 are removed, a blank plate (i.e., a plate without holes for device attachment) may be attached the base section 1312, for example, by snapping in the blank plate through the hole 1504. In some example embodiments, the luminaire 1300 may include blank plates instead of one or more of the knockout sections.

In some example embodiments, the luminaire 1300 may include the power supply 1604 that provides power to the light source 1404 and/or to one or more of the devices 1322, 1324, 1326, 1328, 1332. The power supply 1604 may also provide power to replacement devices that are installed as replacements to the devices 1322, 1324, 1326, 1328, 1332. The power supply 1604 may also provide power to a new device that may be added after removing the knockout section 1330 or another knockout section of the luminaire 1300. In some example embodiments, the modular high bay luminaire 1300 may also include a receptacle similar to the receptacle 412 shown in FIG. 4B and described above without departing from the scope of this disclosure. For example, the receptacle may be located at the back of the housing 1302 away from view from the bottom side of the modular high bay luminaire 1300.

In some example embodiments, one or more of the devices 1322, 1324, 1326, 1328, 1332 may be omitted at initial installation of the luminaire 1300 and may be subsequently added based on the preference of the occupant of the space illuminated by the luminaire 1300. For example, when a daylight sensor is not required by code, the luminaire 1300 may not include any daylight sensors. Further, devices that are not required for compliance with building and/or energy codes may be omitted from the luminaire 1300 at initial installation to reduce construction cost. In addition, the initial luminaire 1300 installed during construction of a building may include basic light sources and optics in the light modules 1304, 1306, and an occupant of the building may change the light sources and/or optics of the light modules 1304, 1306. By providing the ability to replace and add components, the modular high bay luminaire 1300 enables cost reduction and customization while achieving relevant code compliance.

In some alternative embodiments, the modular high bay luminaire 1300 may include more or fewer light modules than shown without departing from the scope of this disclosure. In some alternative embodiments, the modular high bay luminaire 1300 may include fewer or more components than shown without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A modular troffer luminaire, comprising:
a housing having a perimeter frame and a back cover attached to the perimeter frame; and
a first light module removably attached to the back cover, wherein the first light module is replaceable by a second light module after the modular troffer luminaire is installed, wherein the first light module comprises an LED light source and an optic, wherein a light emitted by the LED light source exits the housing between sections of the perimeter frame, wherein the perimeter frame comprises a knockout section that is removable from the perimeter frame to form a hole on a side of the perimeter frame facing toward an area below the modular troffer luminaire when the modular troffer luminaire is installed, and wherein the hole is used for attaching a device to the perimeter frame.

2. The modular troffer luminaire of claim 1, wherein the hole is sized to allow at least a portion of the device to extend down through the hole, wherein the device is a sensor, and wherein the first light module is controllable based on sensing information from the sensor.

3. The modular troffer luminaire of claim 2, further comprising an electrical cable configured to carry an electrical power to the device or to a second device after the device is replaced by the second device.

4. The modular troffer luminaire of claim 2, wherein the device is replaceable by a non-sensor device after the device is attached to the perimeter frame.

5. The modular troffer luminaire of claim 1, wherein the perimeter frame comprises a second knockout section that is removable from the perimeter frame and wherein removing the second knockout section from the perimeter frame leaves a second hole in the perimeter frame for attaching a second device to the perimeter frame.

6. The modular troffer luminaire of claim 1, further comprising an electronics compartment, wherein a driver that provides an electrical power to the first light module is positioned in the electronics compartment.

7. The modular troffer luminaire of claim 6, further comprising a low voltage electrical wire extending between the electronics compartment and the perimeter frame, wherein the low voltage electrical wire is configured to carry a second electrical power to the device when the device is attached to the perimeter frame.

8. The modular troffer luminaire of claim 6, further comprising a spare low voltage electrical cable that is routed between the electronics compartment and the perimeter frame.

9. The modular troffer luminaire of claim 1, further comprising a power receptacle attached to the housing, wherein the power receptacle comprises a port coupled to an input power wiring of the modular troffer luminaire and wherein the port is configured to be connected to an auxiliary power supply.

10. The modular troffer luminaire of claim 9, wherein the power receptacle comprises a second port coupled to one or more dim control inputs of a driver of the modular troffer luminaire by one or more electrical wires and wherein the second port is configured to be connected to a dim control device.

11. The modular troffer luminaire of claim 9, wherein the power receptacle is a Class 1 receptacle.

12. A modular troffer luminaire, comprising:
a housing having a perimeter frame and a back cover attached to the perimeter frame; and
a first light module removably attached to the back cover, wherein the first light module is replaceable by a second light module after the modular troffer luminaire is installed, wherein the first light module comprises an LED light source and a light emitting panel, wherein a light emitted by the LED light source exits the housing between sections of the perimeter frame, wherein the perimeter frame comprises a knockout section that is removable from the perimeter frame, and wherein removing the knockout section from the perimeter frame leaves a hole in the perimeter frame for attaching a device to the perimeter frame.

13. The modular troffer luminaire of claim 12, wherein the hole is sized to allow at least a portion of the device to extend down through the hole, wherein the device is a sensor, and wherein the first light module is controllable based on sensing information from the sensor.

14. The modular troffer luminaire of claim 12, further comprising an electrical cable configured to carry an electrical power to the device or to a second device after the device is replaced by the second device.

15. The modular troffer luminaire of claim 12, wherein the perimeter frame comprises a second knockout section that is removable from the perimeter frame and wherein removing the second knockout section from the perimeter frame leaves a second hole in the perimeter frame for attaching a second device to the perimeter frame.

16. A modular high bay luminaire, comprising:
a housing;
an enclosure attached to the housing; and
a light module attached to the housing, the light module comprising a first light emitting diode (LED) light source and an optic, wherein the first LED light source is replaceable by a second LED light source after the modular high bay luminaire is installed, wherein the enclosure comprises a knockout section that is removable from the enclosure to form a hole facing toward an area below the modular high bay luminaire when the modular high bay luminaire is installed, and wherein the hole is usable for attaching a device to the enclosure.

17. The modular high bay luminaire of claim 16, wherein the optic is replaceable by a second optic.

18. The modular high bay luminaire of claim 16, further comprising a second enclosure attached to the housing, the second enclosure having a cavity for positioning a second device therein, wherein the housing is positioned between the enclosure and the second enclosure.

19. The modular high bay luminaire of claim 16, wherein a power supply configured to provide power to the light module is positioned in a cavity of the housing.

20. The modular high bay luminaire of claim 19, wherein the device is powered by the power supply via a low voltage electrical wire coupled to the power supply.

* * * * *